US012792187B2

(12) United States Patent
Moon et al.

(10) Patent No.: US 12,792,187 B2
(45) Date of Patent: Nov. 10, 2026

(54) ELECTRONIC DEVICE INCLUDING SENSOR UNIT HAVING EDGE PATTERN IN DEAD SPACE

(71) Applicant: HiDeep Inc., Seongnam-si (KR)

(72) Inventors: Ho Jun Moon, Seongnam-si (KR); Hyong Cheol Shin, Seongnam-si (KR); Seyeob Kim, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 19/283,397

(22) Filed: Jul. 29, 2025

(65) Prior Publication Data

US 2026/0029882 A1 Jan. 29, 2026

(30) Foreign Application Priority Data

Jul. 29, 2024 (KR) ........................ 10-2024-0100579
Oct. 30, 2024 (KR) ........................ 10-2024-0150857

(51) Int. Cl.
*G06F 3/044* (2006.01)
*G06F 3/041* (2006.01)

(52) U.S. Cl.
CPC ........ *G06F 3/0441* (2019.05); *G06F 3/04186* (2019.05); *G06F 3/0448* (2019.05); *G06F 2203/04102* (2013.01); *G06F 2203/04106* (2013.01)

(58) Field of Classification Search
CPC .. G06F 3/0441; G06F 3/04186; G06F 3/0448; G06F 2203/04102; G06F 2203/04106; G06F 3/04164; G06F 3/046; G06F 3/0446
See application file for complete search history.

(56) References Cited

U.S. PATENT DOCUMENTS

| | | | | |
|---|---|---|---|---|
| 11,630,543 | B2 * | 4/2023 | Kim | G06F 3/0446 345/173 |
| 2021/0311578 | A1 * | 10/2021 | Tominaga | G02F 1/1368 |
| 2024/0248571 | A1 | 7/2024 | Kim et al. | |
| 2024/0361874 | A1 * | 10/2024 | Zhang | G06F 3/04164 |
| 2025/0077016 | A1 * | 3/2025 | Zhang | G06F 3/0448 |
| 2026/0003463 | A1 * | 1/2026 | Nam | G06F 3/0442 |

FOREIGN PATENT DOCUMENTS

| | | | |
|---|---|---|---|
| EP | 4318191 | A1 | 2/2024 |
| JP | 2021163393 | A | 10/2021 |
| JP | 2024042042 | A | 3/2024 |
| KR | 1020140094232 | A | 7/2014 |
| KR | 1020170140460 | A | 12/2017 |
| KR | 020210088288 | A | 7/2021 |
| KR | 1020240096436 | A | 6/2024 |

OTHER PUBLICATIONS

Extended European Search Report 25192154.0, Issued Dec. 16, 2025.

Japanese Office Action No. 2025-115773, issued on Jun. 16, 2026.

* cited by examiner

*Primary Examiner* — Rodney Amadiz

(74) *Attorney, Agent, or Firm* — The Belles Group, P.C.

(57) ABSTRACT

The present disclosure relates to an electronic device, and more particularly, to an electronic device capable of simultaneously sensing a stylus pen and an object such as a finger brought into proximity or contact with the electronic device from the outside and capable of improving sensitivity degradation at an edge portion of an active area of a display screen.

18 Claims, 23 Drawing Sheets

ELECTRONIC DEVICE INCLUDING SENSOR UNIT HAVING EDGE PATTERN IN DEAD SPACE

CROSS-REFERENCE TO RELATED APPLICATIONS

This U.S. Non-Provisional Patent Application claims the benefit under 35 USC § 119 of Korean Patent Application No. 10-2024-0100579, filed on Jul. 29, 2024, and of Korean Patent Application No. 10-2024-0150857, filed on Oct. 30, 2024, the entire contents of all of which are hereby incorporated by reference herein, for all purposes.

BACKGROUND

The present disclosure relates to an electronic device, and more particularly, to an electronic device capable of simultaneously sensing a stylus pen and an object such as a finger brought into proximity or contact with the electronic device from the outside and capable of improving sensitivity degradation at an edge portion of an active area of a display screen.

In recent years, a smartphone and a tablet personal computer (PC) are actively spreading, and a technology for a built-in contact position measurement device is also actively developing.

The smartphone or the tablet PC generally includes a touch screen, and a user may use a finger or a stylus pen to designate specific coordinates on the touch screen. The user may input a specific signal to the smartphone by designating specific coordinates on the touch screen.

The touch screen may operate based on an electrical method, an infrared methods, and an ultrasound method. The electrical operation method may include, e.g., a R-type touch screens (resistive touch screen) or a C-type touch screen (capacitive touch screen).

Typically, the R-type touch screen capable of simultaneously recognizing a finger of a user and a stylus pen are widely used. However, the R-type touch screen has a limitation of reflection caused by an air layer between ITO layers. Accordingly, in recent years, the C-type touch screen is increasingly applied. The C-type touch screen operates in a method of sensing a difference between capacitances of transparent electrodes generated by contact of an object. However, the C-type touch screens has a disadvantage of generating an operational error caused by unintended contact of a hand when using a stylus pen because it is difficult to physically distinguish between the object such as the finger and the stylus pen.

Typically, in order to overcome the disadvantage, separate software that distinguishes the hand from the stylus pen based on a contact area is used, or a position measurement device in an electro magnetic resonance (EMR) method is used to distinguish the hand from the stylus pen. Here, the EMR method has an advantage of being insensitive to a display and an external noise by using a magnetic field instead of an electric field as driving force when using a touch function with the stylus pen while a touch and a display operate, thus having the advantage of being insensitive to the display and external noise.

However, the EMR method requires attaching a sensor film manufactured by using an additional separate FPCB to a bottom surface of a display panel to generate and transmit a magnetic field to the stylus pen and receive a magnetic field generated by the stylus pen again.

The sensor film is also referred to as a digitizer. When a position of the stylus pen that generates a magnetic field is changed, a separate integrated circuit detects the change of the magnetic field generated by an interaction.

SUMMARY

The present disclosure provides an electronic device that does not require a separate sensor (e.g., a digitizer) for driving and/or sensing a stylus pen.

The present disclosure also provides an electronic device capable of simultaneously sensing a stylus pen and an object such as a finger brought into proximity or contact with the electronic device from the outside.

The present disclosure also provides an electronic device capable of improving sensitivity degradation of a stylus pen at an edge portion of an active area of a display screen.

An embodiment of the present disclosure provides an electronic device including: a display panel having an active area and a dead space; a sensor unit including a plurality of patterns of which at least a portion overlaps the active area; and a controller configured to control the sensor unit, in which the sensor unit includes an edge pattern that overlaps the dead space, is disposed adjacent to the active area, and has both ends electrically connected to the controller.

In an embodiment of the present disclosure, an electronic device includes: a display panel having an active area and a dead space; a sensor unit including a plurality of patterns of which at least a portion overlaps the active area; and a controller configured to control the sensor unit, in which the sensor unit includes a first edge pattern that overlaps the dead space and is disposed adjacent to one side of the active area, and the first edge pattern includes: a first-1 edge pattern having one end that is electrically floated and the other end that is electrically connected to the controller; and a first-2 edge pattern disposed adjacent to the first-1 edge pattern and having one end that is electrically connected to the controller and the other end that is electrically floated

BRIEF DESCRIPTION OF THE FIGURES

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
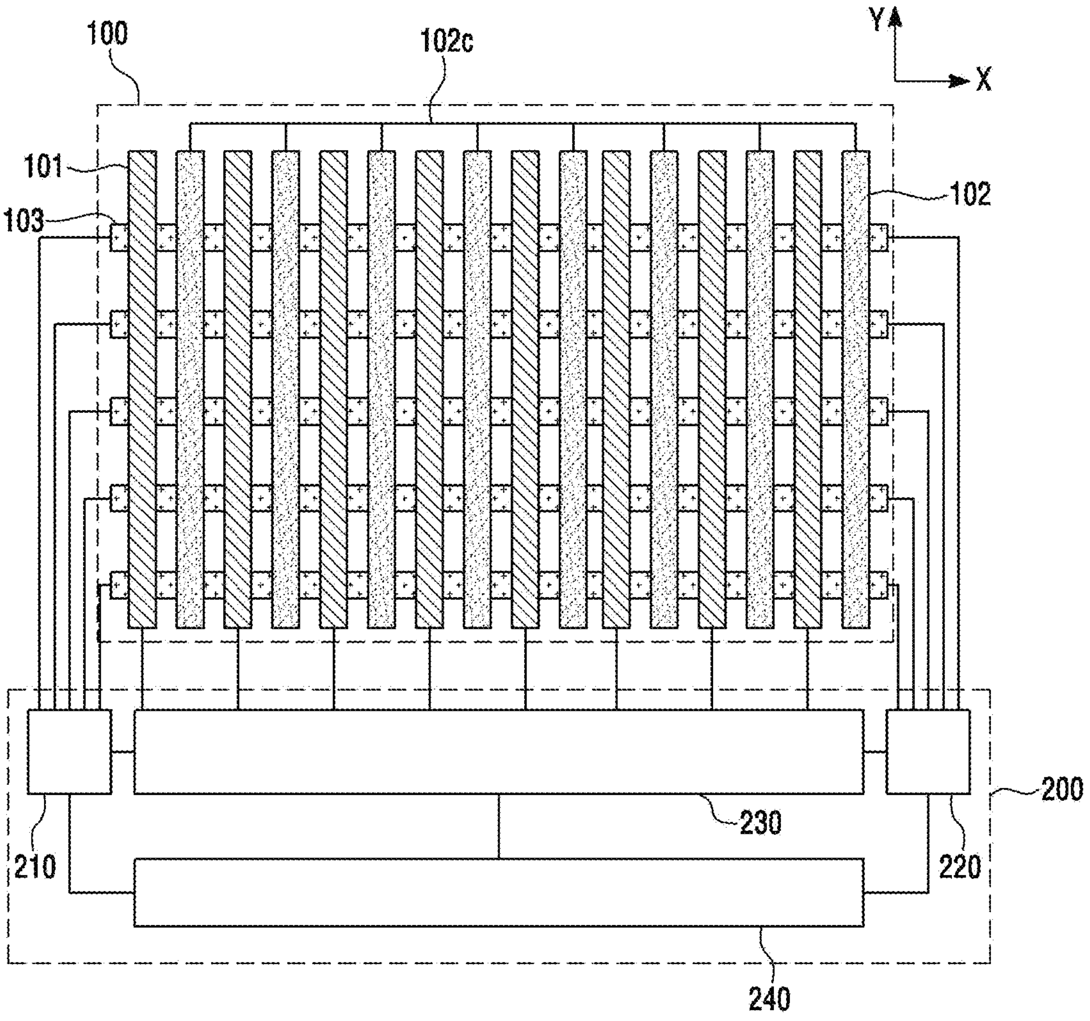
FIG. 1 is a schematic configuration view illustrating an electronic device according to a first embodiment of the present disclosure.

The present disclosure will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present disclosure. In the drawings, like reference numerals refer to like elements throughout.

An electronic device according to various embodiments of the present document may be an electronic device such as a typical smartphone or an electronic device having a rectangular screen that is relatively greater than a screen of the typical smartphone and having a diagonal length of about 10 inches or more to about 13 inches or less. For example, the electronic device may include at least one of a foldable smartphone, a tablet personal computer, a vehicle display device, an e-book reader, a laptop personal computer, and a netbook computer.

Also, the electronic device according to various embodiments of the present disclosure may detect a position of an object such as a finger disposed on a screen, output a driving signal for driving a stylus pen, and detect a position of the stylus pen disposed on the screen by sensing a signal output from the stylus pen.

Also, the electronic device according to various embodiments of the present disclosure includes a foldable device having at least one folded screen, and the foldable device includes a tablet personal computer (PC) or laptop PC in addition to a smartphone.

Hereinafter, various embodiments will be described in detail with reference to the accompanying drawings.

An embodiment (or embodiments) of the electronic device, which may solve the above-described limitations, will be described in detail with reference to drawings below.

FIG. 1 is a schematic configuration view illustrating an electronic device according to a first embodiment of the present disclosure.

Referring to FIG. 1, the electronic device according to the first embodiment includes a sensor unit 100 and a controller 200 and further include a plurality of traces that electrically connect the sensor unit 100 and the controller 200.

The sensor unit 100 may sense a conductive object such as a finger and drive and/or sense a stylus pen.

The sensor unit 100 includes a plurality of patterns (or a plurality of electrodes). A plurality of patterns may include a plurality of first to third patterns 101, 102, and 103.

The first pattern 101 has a shape extending in a first direction Y. The first direction Y may cross a second direction X. The first direction Y may be a direction of a minor axis of a display screen of the electronic device. The first pattern 101 may be also referred to as a RX electrode (a first touch electrode or a touch receiving electrode).

Each of a plurality of first patterns 101 has one end that is electrically connected to the controller 200 through the traces and the other end that is electrically floating.

Each of the second patterns 102 has a shape extending in the first direction Y, is disposed adjacent to the first pattern 101, and is spaced a predetermined distance from the first pattern 101. The second pattern 102 may also be referred to as a SRX electrode (a Stylus RX, a first pen electrode, or a pen receiving electrode).

The plurality of second patterns 102 have one ends that are electrically connected to each other through at least one trace 102*c* and the other ends that are electrically floating. Although not illustrated in the drawings, the other ends may be electrically connected to the controller 200 depending on cases.

The first and second patterns 101 and 102 may be disposed on a layer different from that of the third pattern 103. The first and second patterns 101 and 102 may be disposed on the same layer as the third pattern 103 depending on cases. The first and second patterns 101 and 102 are spaced a predetermined distance from the third pattern 103.

The third pattern 103 has a shape extending in the second direction X. The second direction X may be a direction of a major axis of the display screen of the electronic device. The third pattern 103 may be also referred to as a TX electrode (a second touch electrode, a touch driving electrode, or a stylus driving electrode).

The third pattern 103 has both ends that are electrically connected to the controller 200 through the trace. Here, one end and the other end of the third pattern 103 may be independently connected to different channels of the controller 200. That is, the one end and the other end of the third pattern 103 may be connected to different terminals (or ports) of the controller 200, respectively, instead of being electrically connected to each other. More particularly, the third pattern 103 has one end connected to the first circuit unit 210 of the controller 200 through one trace (or trace pattern) and the other end connected to the second circuit unit 220 of the controller 200 through another trace (or trace pattern). Hereinafter, the above-described method of electrically connecting both the ends of each of the plurality of third patterns 103 to the controller 200 through the traces is referred to as a "double routing method".

The plurality of third patterns 103 are arranged in the first direction Y. The plurality of first patterns 101 are arranged in the second direction X, and the plurality of second patterns 102 are also arranged in the second direction X.

Since the third pattern 103 extends in the second direction X, the first pattern 101 extends in the first direction Y, and the second direction X is longer than the first direction Y, the number of the plurality of third patterns 103 is less than the number of the plurality of first patterns 101. Thus, the number of channels of the plurality of third patterns 103 formed in the controller 200 is less than that of channels of the plurality of first patterns 101. Here, the number of the plurality of first patterns 101 and the number of the plurality of third patterns 103 may increase or decrease based on a size of the screen of the electronic device.

In the sensor unit 100 of FIG. 1, the third pattern 103 may be referred to as a first pattern in the second direction X, the first pattern 101 may be referred to as a first pattern in the first direction Y, and the second pattern 102 may be referred to as a second pattern in the first direction Y.

One end disposed closer to the controller 200 among both the ends of the first pattern 101 arranged in the first direction (or the direction of the minor axis) is electrically connected to the controller 200 through the trace, and the other end is electrically floating. Here, the one end of the first pattern 101 may be connected to the third circuit unit 230 of the controller 200.

One end disposed closer to the controller 200 among both the ends of the second pattern 102 disposed adjacent to the first pattern 101 and arranged in the first direction (or the direction of the minor axis) is electrically floating, and the other end is electrically connected to the other ends of other first patterns through at least one trace. Although not shown in the drawings, the one end of the second pattern 102 may be electrically connected to the controller 200 depending on cases. Also, at least two of the one ends of the plurality of second patterns 102 may be electrically connected to each other and electrically connected to the controller 200.

The touch controller 200 includes a first circuit unit 210, a second circuit unit 220, a third circuit unit 230, and a control unit 240.

Each of the first circuit unit 210 and the second circuit unit 220 of the controller 200 may include a touch driving circuit unit that outputs a touch driving signal, a first driving circuit unit that outputs a first driving signal, a first inverse driving circuit unit that outputs an inverse signal of the first driving signal, a ground circuit unit, and a receiving circuit unit that receives a pen signal. The third circuit unit 230 may include a receiving circuit unit that receives a touch sensing signal or a pen signal.

The electronic device according to the first embodiment of the present disclosure may be a landscape-type electronic device. The sensor unit 100 of the landscape-type electronic device has a width in the second direction X, which is greater than a height in the first direction Y, and the controller 200 that controls the sensor unit 100 is disposed below the sensor unit 100. The landscape-type electronic device may correspond to, e.g., a shape of a tablet PC or a foldable smartphone.

The electronic device including the sensor unit 100 and the controller 200 according to the first embodiment of the present disclosure may detect a position of an object such as a finger disposed on the screen of the electronic device, drive the stylus pen brought into proximity or contact with the screen, and sense a signal emitted from the stylus pen to detect the position of the stylus pen disposed on the screen. Furthermore, the number of channels between the sensor unit 100 and the controller 200 may also decrease. Hereinafter, the present disclosure will be described in detail with reference to FIGS. 2 to 10.

Figure 2:
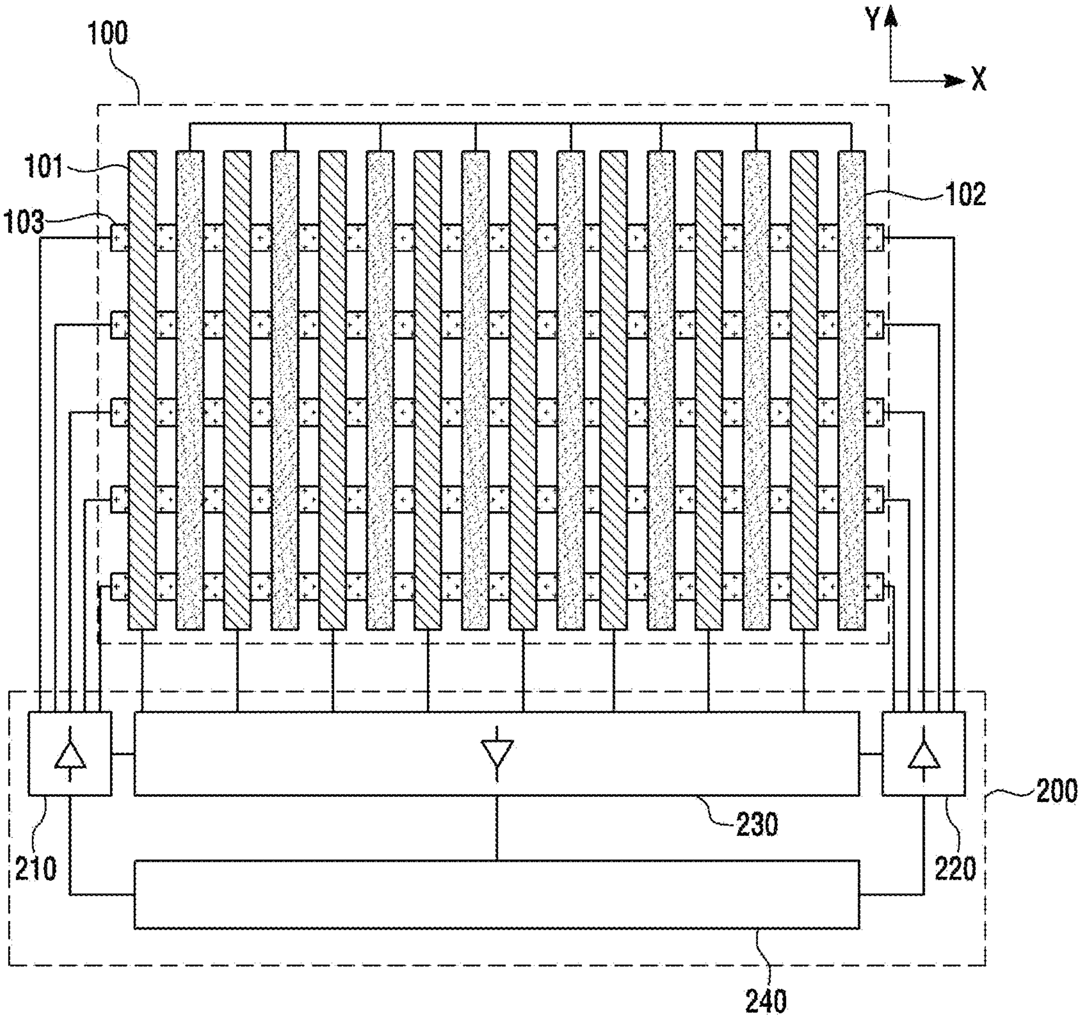
FIG. 2 is a view for explaining a first mode (or touch sensing mode) for the electronic device in FIG. 1 to sense an object.
Figure 3:
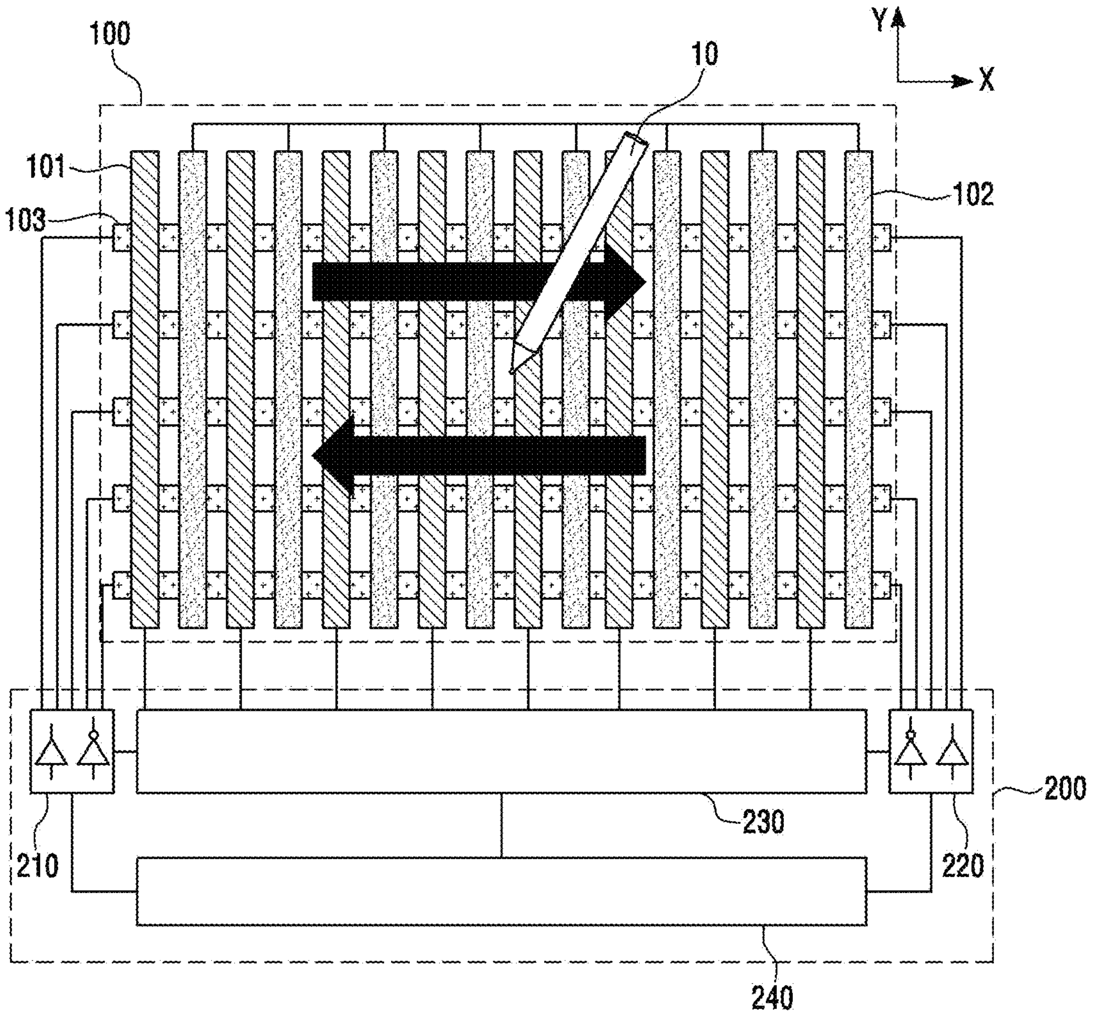
FIGS. 3 and 4 are views for explaining a second mode (or edge mode) for the electronic device in FIG. 1 to drive a stylus pen.
Figure 4:
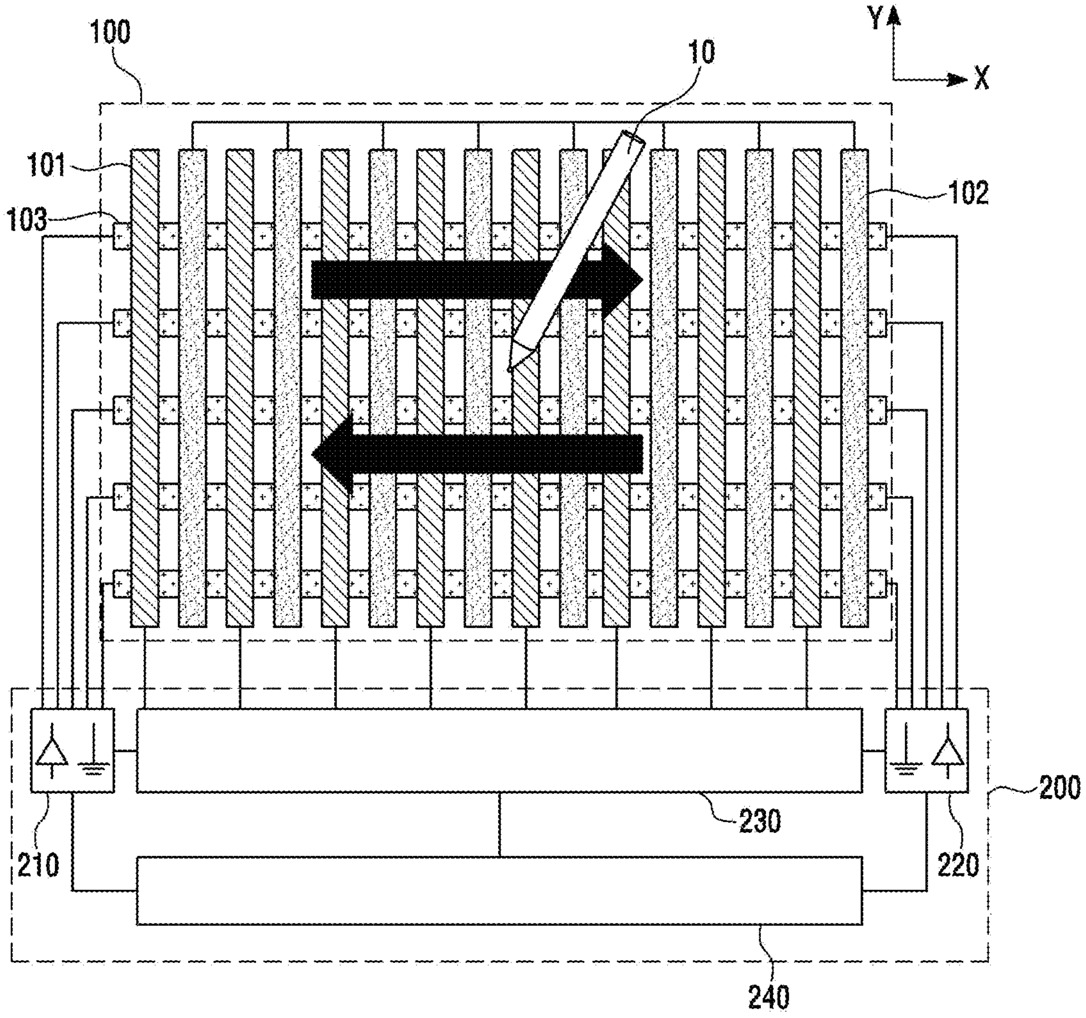
Figure 5:
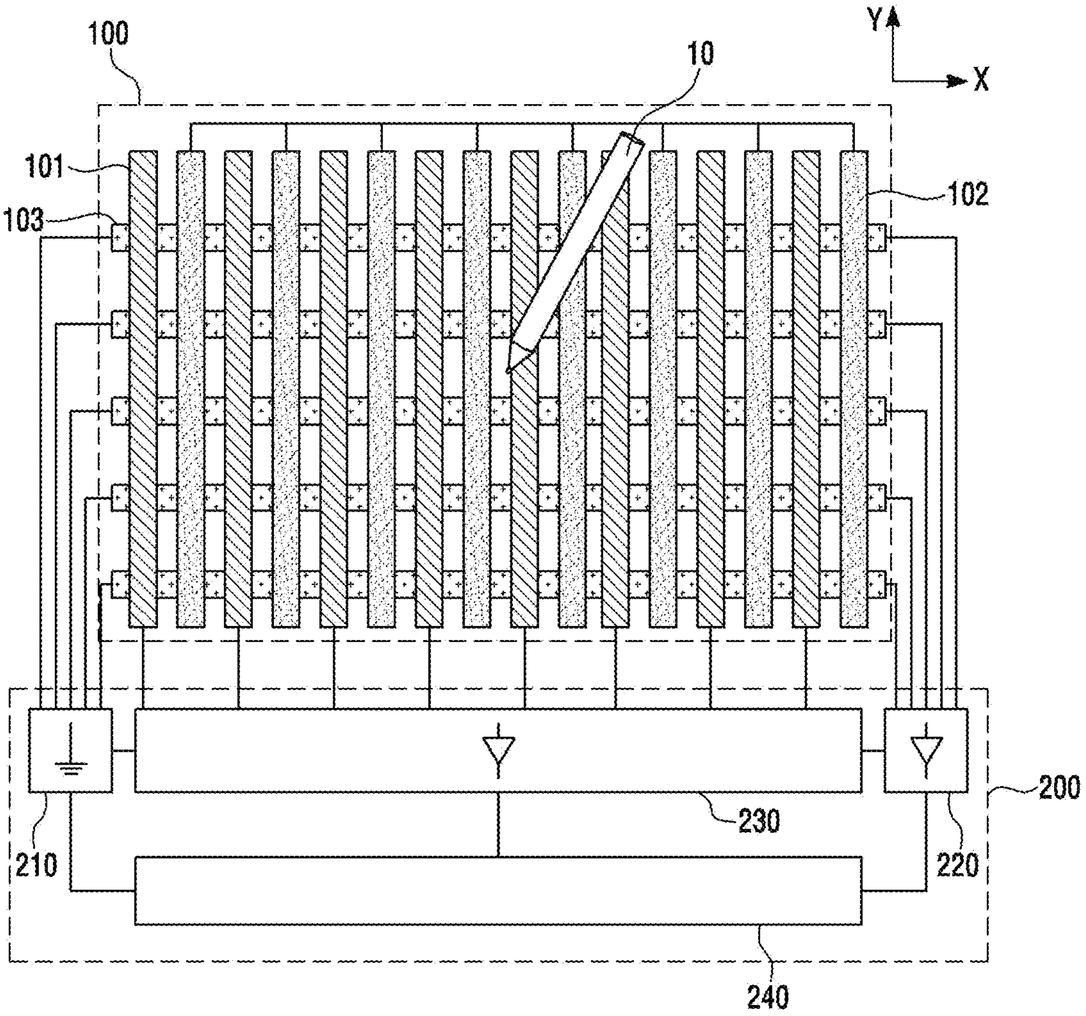
FIG. 5 is a view for explaining a third mode (or downlink mode) for the electronic device in FIG. 1 to sense (or detect) the stylus pen.

FIG. 2 is a view for explaining a first mode (or a touch sensing mode) for the electronic device in FIG. 1 to sense an object, FIGS. 3 to 4 are views for explaining a second mode (or an edge mode) for the electronic device in FIG. 1 to drive the stylus pen, and FIG. 5 is a view for explaining a third mode (or a downlink mode) for the electronic device in FIG. 1 to sense (or detect) the stylus pen.

The touch controller 200 of the electronic device according to the first embodiment of the present disclosure may sense a conductive object such as a finger brought into proximity or contact with the sensor unit 100 by using the plurality of first patterns 101 and the plurality of third patterns 103 of the sensor unit 100.

Specifically, referring to FIG. 2, the controller 200 may use the plurality of third patterns 103 of the sensor unit 100 as the touch driving electrode TX to which the touch driving signal is applied and the plurality of first patterns 101 as the touch receiving electrode RX that outputs the touch receiving signal, and vice versa.

The control unit 240 of the controller 200 may control the first circuit unit 210 and the second circuit unit 220 to apply a touch driving signal to the plurality of third patterns 103. To this end, each of the first circuit unit 210 and the second circuit unit 220 may output a touch driving signal by a control signal emitted from the control unit 240.

The control unit 240 may allow the first circuit unit 210 to apply a touch driving signal to one ends of the plurality of third patterns 103 and the second circuit unit 220 to simultaneously apply the touch driving signal to the other ends of the plurality of third patterns 103. When the same touch driving signal is applied to both ends of each of the third patterns 103 as described above, a position of maximum resistance in each of the third patterns 103 may be a central portion of the corresponding third pattern 103.

The control unit 240 may receive touch sensing signals through the plurality of first patterns 101. Each of received touch sensing signals includes information on an amount of variation in capacitance between the respective first and third patterns 101 and 103. The control unit 240 may determine a position of an object based on the amount of variation in capacitance.

Although not shown in the drawings, the control unit 240 may control by using a so-called 'self-sensing method', such that the touch driving signal is applied to each of the first pattern 101 and the third pattern 103, and the touch sensing signal is output from each of the first pattern 101 and the third pattern 103.

The controller 200 of the electronic device according to the first embodiment of the present disclosure may form a current loop for driving the stylus pen by using the plurality of third patterns 103.

The controller 200 may form a current loop for driving the stylus pen in the sensor unit 100 by using one of two methods that will be described with reference to FIGS. 3 and 4 below.

First, as illustrated in FIG. 3, the controller 200 controls a preset current to flow through one or more third patterns among the plurality of third patterns 103 along the second direction X and controls the current to simultaneously flow through one or more third patterns along a second opposite direction −X that is a direction opposite to the second direction X. Here, the controller 200 may select the one or more third patterns and the one or more other third patterns based on a position of the stylus pen 10 brought into proximity or contact with the screen. Here, based on the position of the stylus pen 10, the third pattern(s) disposed thereabove are the one or more third patterns, and the third pattern(s) disposed therebelow are the one or more other third patterns.

The control unit 240 may control the first circuit unit 210 so that a first driving signal is applied to one end of the one or more third patterns among the plurality of third patterns 103 and the second circuit unit 220 so that a first inverse driving signal that is an inverse signal of the first driving signal is applied to the other end of the one or more third patterns, thereby allowing the current in the second direction X to flow through the one or more third patterns. Here, the first driving signal may be a pulse waveform signal or a sine waveform signal.

At the same time, the control unit 240 may control the first circuit unit 210 so that the first inverse driving signal is applied to one ends of the one or more other third patterns among the plurality of third patterns 103 and the second circuit unit 220 so that the first driving signal is applied to the other ends of the one or more other third patterns, thereby allowing the current in the second opposite direction −X to flow through the rest third patterns.

The current in the second direction X, which flows through the some third patterns, and the current in the second opposite direction −X, which flows through the other third patterns, may form at least one current loop around the stylus pen 10. The formed current loop may generate a magnetic field, and the generated magnetic field may allow a resonance circuit unit disposed in the stylus pen 10 to resonate, thereby driving the stylus pen 10.

Next, as illustrated in FIG. 4, the control unit 240 may control the first circuit unit 210 so that a first driving signal is applied to one ends of some first patterns among the plurality of first patterns 103 and the second circuit unit 220 so that the other ends of the some first patterns are grounded, thereby allowing the current in the first direction Y to flow through the some first patterns.

At the same time, the control unit 240 may control the first circuit unit 210 so that the first driving signal is applied to one ends of the rest third patterns among the plurality of third patterns 103 and the second circuit unit 220 so that the other ends of the rest third patterns are grounded, thereby allowing the current in the second opposite direction −X to flow through the rest third patterns.

The current in the second direction X, which flows through the some third patterns, and the current in the second opposite direction −X, which flows through the other third patterns, may form at least one current loop around the stylus pen 10. The formed current loop may generate a magnetic field, and the generated magnetic field may allow the resonance circuit unit disposed in the stylus pen 10 to resonate, thereby driving the stylus pen 10.

The controller 200 of the electronic device according to the first embodiment of the present disclosure may receive a stylus pen signal (hereinafter, referred to as a pen signal) emitted from the stylus pen by using the plurality of first patterns 101 and the plurality of third patterns 103 and determine a position of the stylus pen based on the received pen signal.

As illustrated in FIG. 5, the pen signal may be sensed by using the plurality of first patterns 101 and the plurality of third patterns 103.

The control unit 240 may control the third circuit unit 230 to receive a pen signal from each of the plurality of first patterns 101. The control unit 240 may determine the position of the stylus pen in the second direction X based on the pen signal received by the third circuit unit 230. Here, the pen signal may be received through the plurality of first patterns 101 because an induction signal induced to the second pattern 102 is transmitted to the first pattern 101 disposed adjacent to the second pattern 102 through capacitive coupling formed between the first pattern 101 and the second pattern 102, which are disposed adjacent to each other.

Also, the control unit 240 may control the first circuit unit 210 so that one ends of the plurality of third patterns 103 are electrically grounded and the second circuit unit 220 receives a pen signal from the other end of each of the plurality of third patterns 103. The control unit 240 may determine the position of the stylus pen in the first direction Y based on the pen signal received by the second circuit unit 220.

In FIG. 5, the first circuit unit 210 allows the one ends of the plurality of third patterns 103 to be electrically grounded, and the second circuit unit 220 receives the pen signal from the other ends of the plurality of third patterns 103, and vice versa.

Figure 6:
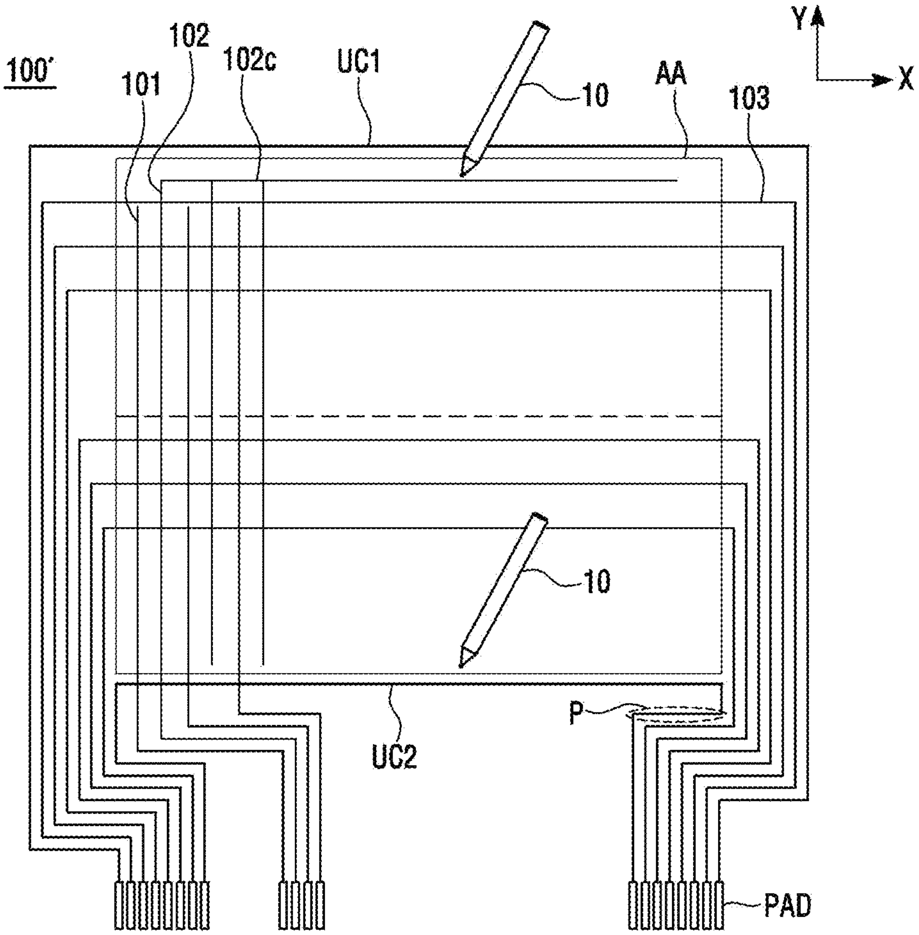
FIG. 6 is a view for explaining a modified example of the sensor unit 100 in FIG. 1.

FIG. 6 is a view for explaining a modified example of the sensor unit 100 in FIG. 1.

A sensor unit 100' in FIG. 6 includes a plurality of first patterns 101, a plurality of second patterns 102, and a plurality of third patterns 103 as with the sensor unit 100 in FIG. 1 and further includes one or more edge channels UC1 and UC2. For reference, the plurality of first patterns 101, the plurality of second patterns 102, and the plurality of third patterns 103 are expressed by simplified lines in FIG. 6 unlike those in FIG. 1.

The plurality of first patterns 101, the plurality of second patterns 102, and the plurality of third patterns 103 are disposed in an active area AA of a display panel. On the other hand, the one or more edge channels UC1 and UC2 are disposed in a dead space (or a bezel) of the display panel.

The display panel includes the active area AA from which light is emitted and the dead space from which light is not emitted. The display panel may be an OLED panel or an LCD panel. The sensor unit 100' may be disposed on the display panel or in the display panel. The active area AA of the display panel overlaps the sensor unit 100'. At least a portion of patterns of the sensor unit 100' may be disposed in the dead space of the display panel. The display panel may be driven by a display controller. The display controller may be provided separately from the above-described controller or integrated with the controller.

Each of the one or more edge channels UC1 and UC2 may be arranged in the second direction X that is the same direction as the plurality of third patterns 103 and include an edge pattern disposed adjacent to one side of the active area AA and a pair of connection patterns connecting both ends of the edge pattern to a pad PAD. Here, the edge pattern and the connection pattern may be integrated with each other.

The edge pattern of the first edge channel UC1 may be disposed on the plurality of third patterns 103 in the XY plane, and the edge pattern of the second edge channel UC2 may be disposed below the plurality of third patterns 103. The plurality of third patterns 103 may be disposed between the edge pattern of the first edge channel UC1 and the edge pattern of the second edge channel UC2. Here, one of the first edge channel UC1 and the second edge channel UC2 may be omitted.

In the case of the sensor unit 100 of FIG. 1, when the stylus pen 10 is brought into proximity or contact with an upper end area or a lower end area of the active area AA, the current loop is hardly formed around the stylus pen 10 because a separate pattern or trace through which a current flows is not provided on the dead space outside the active area AA.

However, in the case of a sensor unit 100' of FIG. 6, since the edge channels UC1 and UC2 are additionally provided in the dead space, a current loop may be formed around the corresponding stylus pen 10 by allowing a predetermined current to flow through the edge channels UC1 and UC2 although the stylus pen is brought into proximity or contact with the upper end area or the lower end area of the active area AA.

Figure 7:
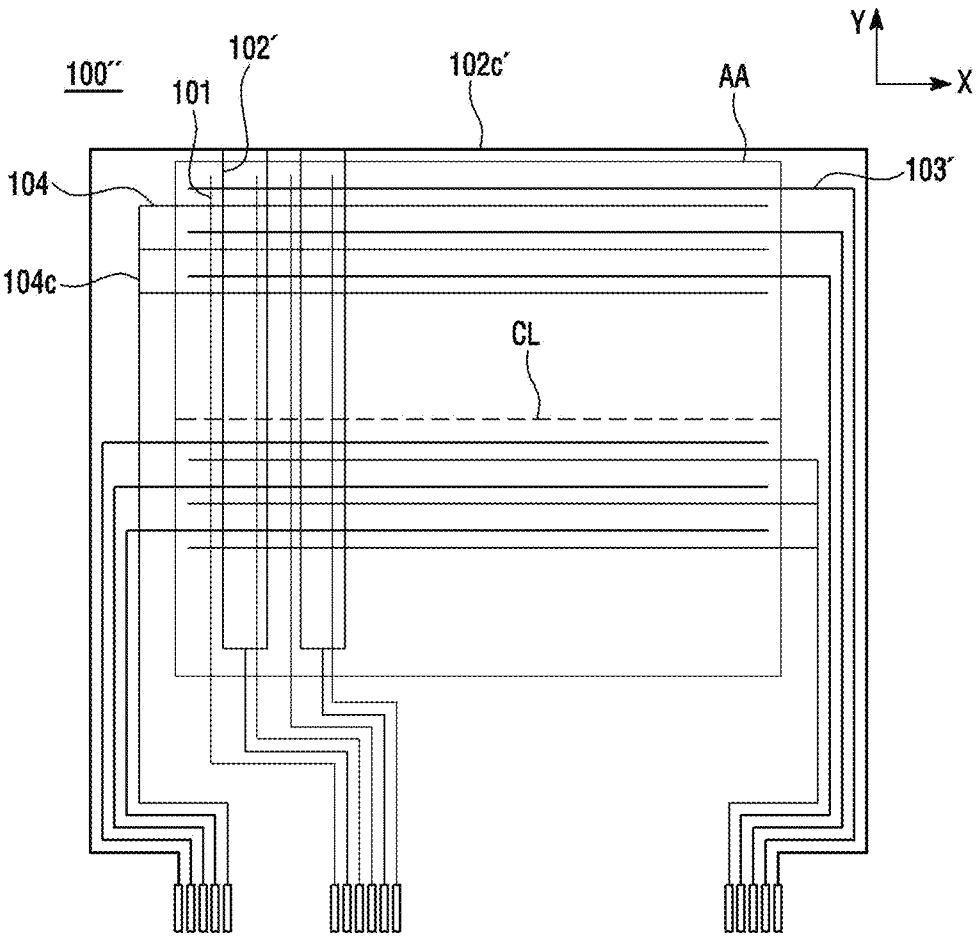
FIG. 7 is a view for explaining another modified example of the sensor unit 100 in FIG. 1.

FIG. 7 is a view for explaining another modified example of the sensor unit 100 in FIG. 1.

A sensor unit 100" illustrated in FIG. 7 is different from the sensor unit 100' illustrated in FIG. 6 in terms of a plurality of second patterns 102' and a plurality of third patterns 103', and further includes a plurality of fourth patterns 104.

Specifically, a trace 102*c*' electrically connecting one ends of the plurality of second patterns 102' is disposed in the dead space outside the active area AA, and a one end part including the one ends of the respective second patterns 102' are disposed in the dead space outside the active area AA. Also, the other ends of the plurality of second patterns 102' are electrically connected in pairs and connected to one pad.

Each of the plurality of third patterns 103' may have a shape extending in the second direction X. Each of the plurality of third patterns 103' may have one end connected to the pad disposed in the dead space outside the active area AA through the trace and the other end that is electrically floating in the active area AA.

Among the plurality of third patterns 103', the third patterns 103' disposed above a reference line CL disposed at a central portion of the active area AA have one ends on the right side and the other end on the left side, while the third patterns 103' disposed below the reference line CL have one end on the left side and the other end on the right side. Since the traces connecting the one end of each third pattern 103' to the pad may be separately disposed in left and right dead spaces outside the active area AA, a width of the left and right dead spaces (bezels) may be reduced.

Here, the reference line CL may be a central line disposed at a center of a general display screen or a folding line along which a foldable display screen is folded.

Each of the plurality of fourth first patterns 104 has a shape extending in the second direction X. The plurality of fourth patterns 104 correspond one-to-one with the plurality of third patterns 103', and one third pattern 103' and one fourth pattern 104, which correspond to each other, are disposed adjacent to each other. Capacitive coupling may be electrically formed between the third pattern 103' and the fourth pattern 104, which are disposed adjacent to each other.

The plurality of fourth patterns 104 have one ends that are electrically connected to each other through a trace 104*c* and the other ends that are electrically floating.

Among the plurality of fourth patterns 104, the fourth patterns 104 disposed above the reference line CL disposed at the central portion of the active area AA have one ends on the right side and the other end on the left side, while the fourth patterns 104 disposed below the reference line CL have one ends on the left side and the other end on the right side. Accordingly, the trace 104*c* connecting the one ends of the fourth patterns 104 disposed above the reference line CL to each other and the trace connecting the one ends of the fourth patterns disposed below the reference line CL to each other are separately arranged on the left and right dead spaces outside the active area AA, respectively.

Figure 8:
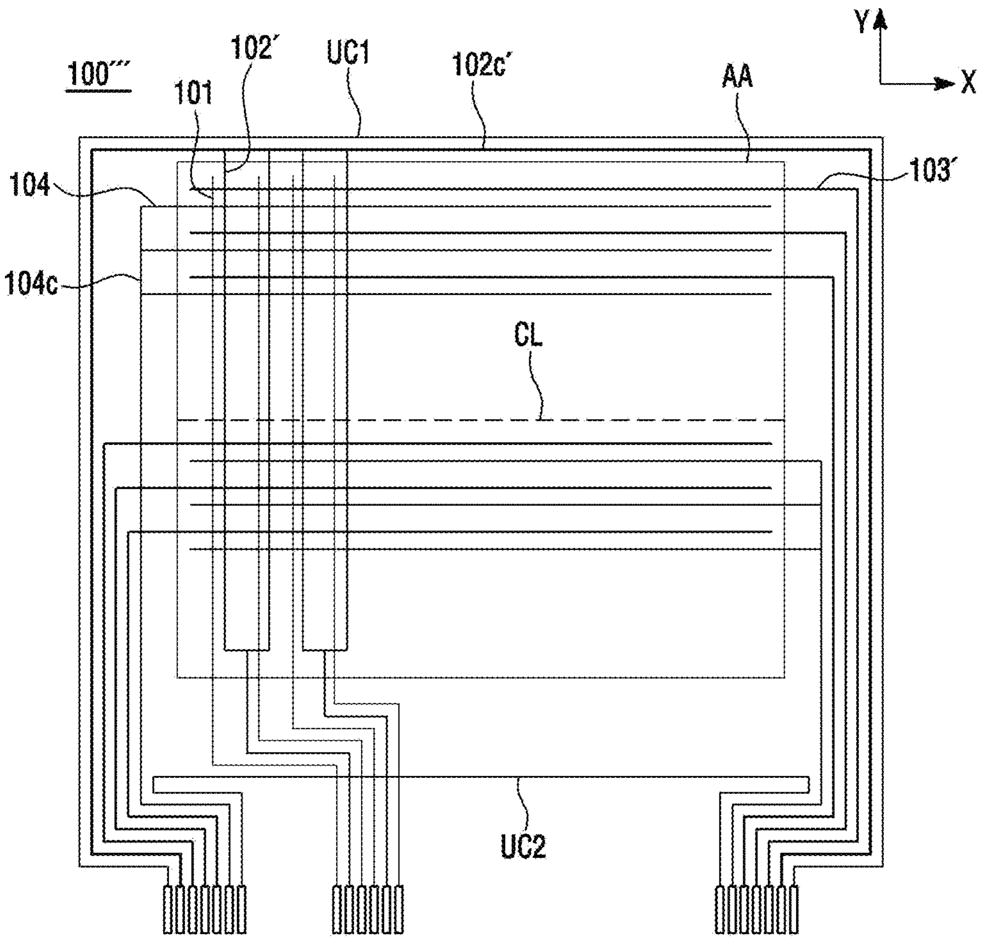
FIG. 8 is a view illustrating a state in which at least one edge channel UC1 and UC2 in FIG. 6 is added to a sensor unit 100" in FIG. 7.

FIG. 8 is a view illustrating a state in which at least one edge channel UC1 or UC2 in FIG. 6 is added to the sensor unit 100" in FIG. 7.

Each of the one or more edge channels UC1 and UC2 may be disposed in the dead space outside the active area AA and include an edge pattern disposed in the second direction X that is the same direction as the plurality of third patterns 103' and a pair of connection traces that connect both ends of the corresponding edge pattern to a pad PAD. Here, the edge patterns and the connection traces may be integrated with each other.

The edge pattern of the first edge channel UC1 may be disposed on the plurality of third patterns 103' on the XY plane, and the edge pattern of the second edge channel UC2 may be disposed below the plurality of third patterns 103'. The plurality of third patterns 103' and the plurality of fourth patterns 104 may be disposed between the edge pattern of the first edge channel UC1 and the edge pattern of the second edge channel UC2. Here, one of the first edge channel UC1 and the second edge channel UC2 may be omitted.

In the case of a sensor unit 100", since the edge channels UC1 and UC2 are additionally provided on the dead space, a current loop may be formed around the corresponding stylus pen 10 by allowing a predetermined current to flow through the edge channels UC1 and UC2 although the stylus pen is brought into proximity or contact with the upper end area or the lower end area of the active area AA. Accordingly, sensitivity degradation that may occur at an edge of the sensor unit 100" may be improved.

Figure 9:
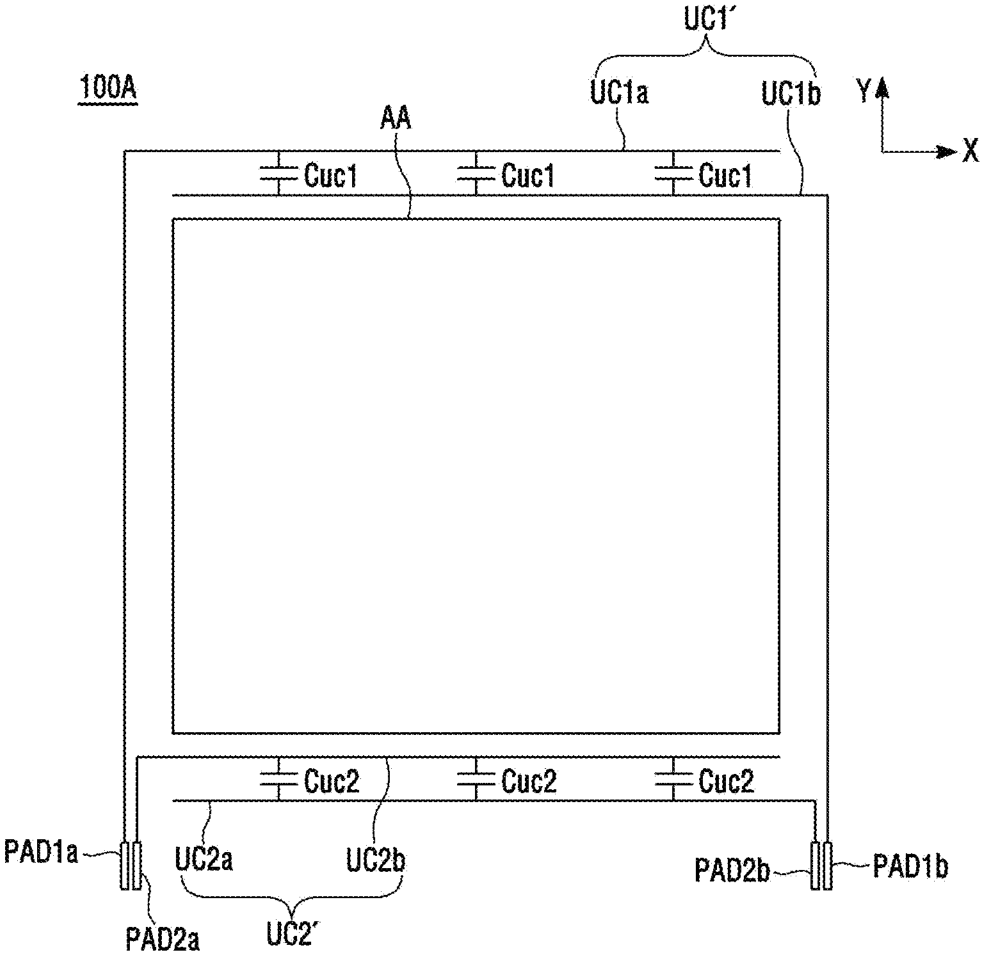
FIG. 9 is a schematic configuration view illustrating a sensor unit of an electronic device according to a second embodiment of the present disclosure.

FIG. 9 is a schematic configuration view of a sensor unit of an electronic device according to a second embodiment of the present disclosure.

Referring to FIG. 9, a sensor unit 100A includes a plurality of patterns (not shown) disposed in an active area AA and edge channels UC1' and UC2' disposed in a dead space outside the active area AA.

The plurality of patterns arranged in the active area AA may correspond to the first to third patterns 101, 102, and 103 in FIG. 1 or the first to fourth patterns 101, 102', 103', and 104 in FIG. 7.

On the XY plane, a first edge channel UC1' is disposed above the active area AA, and a second edge channel UC2' is disposed below the active area AA. The active area AA is disposed between the first edge channel UC1' and the second edge channel UC2'.

The first edge channel UC1' and/or the second edge channel UC2' have a difference in configuration from the first edge channel UC1 and/or the second edge channel UC2 in FIG. 6 or 8.

Specifically, the first edge channel UC1' includes a first-1 edge pattern UC1*a* and a first-2 edge pattern UC1*b*.

Some patterns of the first-1 edge pattern UC1*a* and some patterns of the first-2 edge pattern UC1*b* are disposed adjacent to each other. When an electrical signal is applied to the first-1 edge pattern UC1*a* and the first-2 edge pattern UC1*b* by a controller (not shown), capacitive coupling Cuc1 may be electrically formed between the some patterns of the first-1 edge pattern UC1*a* and the some first-2 edge pattern UC1*b*.

Some patterns of the first-1 edge pattern UC1*a* may extend in the second direction X above the active area AA on the XY plane, the rest patterns of the first-1 edge pattern UC1*a* may extend in the first direction Y from one ends of the some patterns and are disposed on the left side of the active area AA on the XY plane, and the other ends of the rest patterns of the first-1 edge pattern UC1*a* may be connected to a first-a pad PAD1*a*.

Some patterns of the first-2 edge pattern UC1*b* may extend in the second direction X above the active area AA on the XY plane, the rest patterns of the first-2 edge pattern UC1*b* may extend in the first direction Y from one ends of the some patterns and are disposed on the right side of the active area AA on the XY plane, and the other ends of the rest patterns of the first-2 edge pattern UC1*b* may be connected to a first-b pad PAD1*a*.

The some patterns of the first-2 edge pattern UC1*b* are disposed adjacent to the some patterns of the first-1 edge pattern UC1*a* and may be disposed between the some patterns of the first-1 edge pattern UC1*a* and the active area AA.

On the other hand, the second edge channel UC2' includes a second-1 edge pattern UC2*a* and a second-2 edge pattern UC2*b*.

Some patterns of the second-1 edge pattern UC2*a* and some patterns of the second-2 edge pattern UC2*b* may be disposed adjacent to each other. When an electrical signal is applied to the second-1 edge pattern UC2*a* and the second-2 edge pattern UC2*b* by a controller (not shown), capacitive coupling Cuc2 may be electrically formed between the some patterns of the second-1 edge pattern UC2*a* and the some patterns of the second-2 edge pattern UC2*b*.

The some patterns of the second-1 edge pattern UC2*a* may extend in a second direction X below the active area AA on the XY plane, the rest patterns of the third sub-edge pattern UC2*a* may extend in the first direction Y from one end of the some patterns and are disposed below the active area AA on the XY plane, and the other ends of the rest patterns of the second-1 edge pattern UC2*a* may be connected to a second-a pad PAD2*a*.

The some patterns of the second-2 edge pattern UC2*b* may extend in the second direction X below the active area AA on the XY plane, the rest patterns of the second-2 edge pattern UC2*b* may extend in the first direction Y from the other ends of the some patterns and are disposed below the active area AA on the XY plane, and the other ends of the rest patterns of the second-2 edge pattern UC2*b* may be connected to a second-b pad PAD2*b*.

The some patterns of the second-1 edge pattern UC2*a* may be disposed adjacent to the some patterns of the second-2 edge pattern UC2*b* and disposed between the some patterns of the second-2 edge pattern UC2*b* and the active area AA.

Since the sensor unit 100A in FIG. 9 includes one or more edge channels UC1' and UC2' as with the sensor unit in FIG. 6 or 8, the sensitivity degradation that may occur in the edge of the sensor unit 100A may be improved.

Each of the edge channels UC1' and UC2' of the sensor unit 100A in FIG. 9 includes two or more edge patterns, unlike the edge channels of the sensor units in FIG. 6 or 8, and, as some patterns of two or more edge patterns are arranged adjacent to each other, capacitive coupling Cuc1 and Cuc2 are formed between the some patterns of the two adjacent edge patterns when driven by a controller.

The first edge channel UC1 of the sensor unit in FIG. 6 or 8 may surround three sides of the rectangular active area AA to have a relatively long length and resultantly have relatively high resistance. In contrast, the edge channel UC1' of the sensor unit 100A in FIG. 9 may surround two sides of the rectangular active area AA to have a relatively reduced length and resultantly have relatively reduced resistance.

Figure 10:
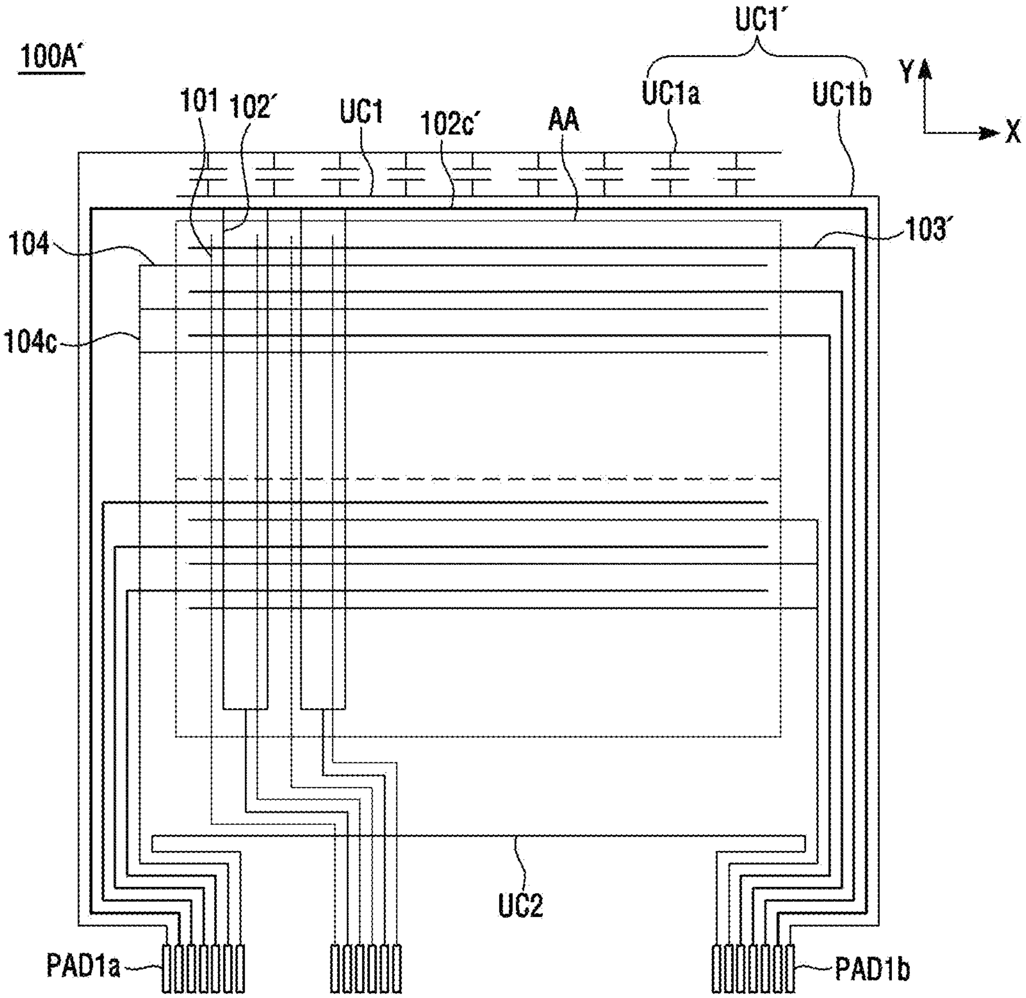
FIGS. 10 to 12 are views for explaining various embodiments of a sensor unit 100A in FIG. 9.
Figure 11:
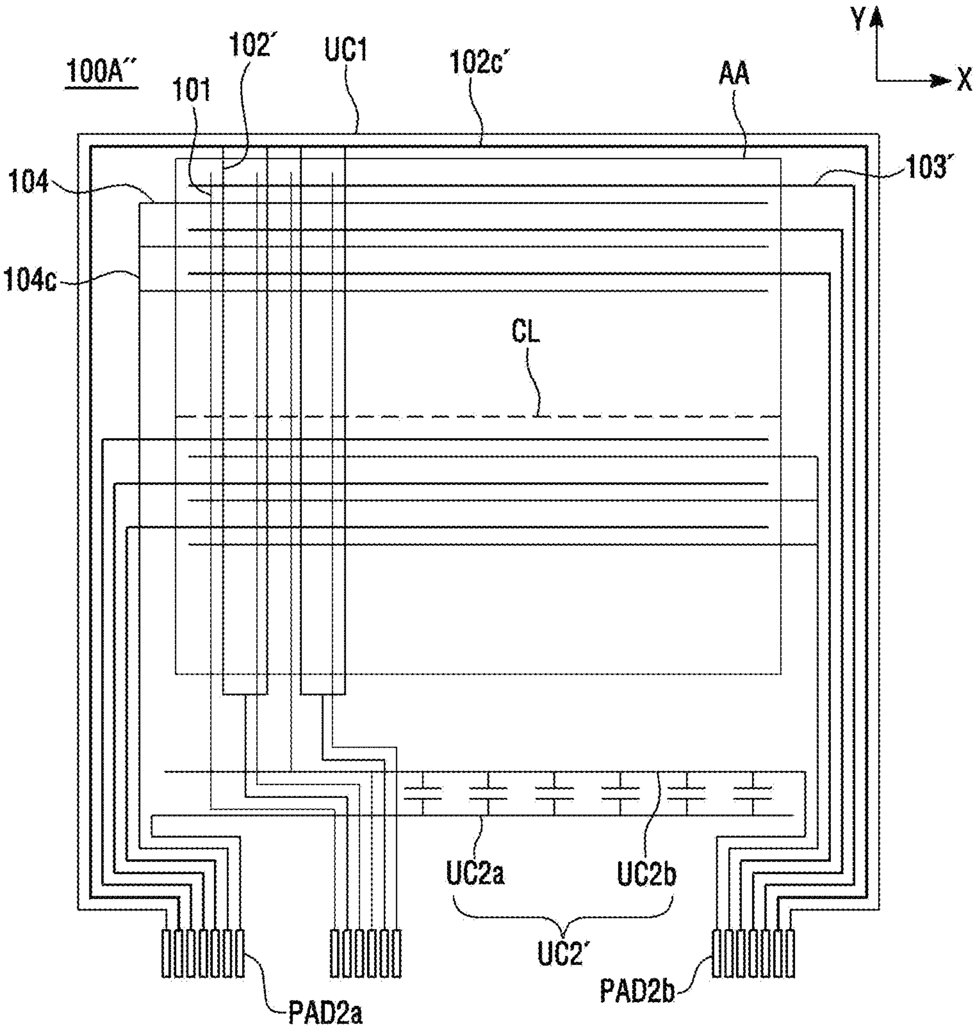
Figure 12:
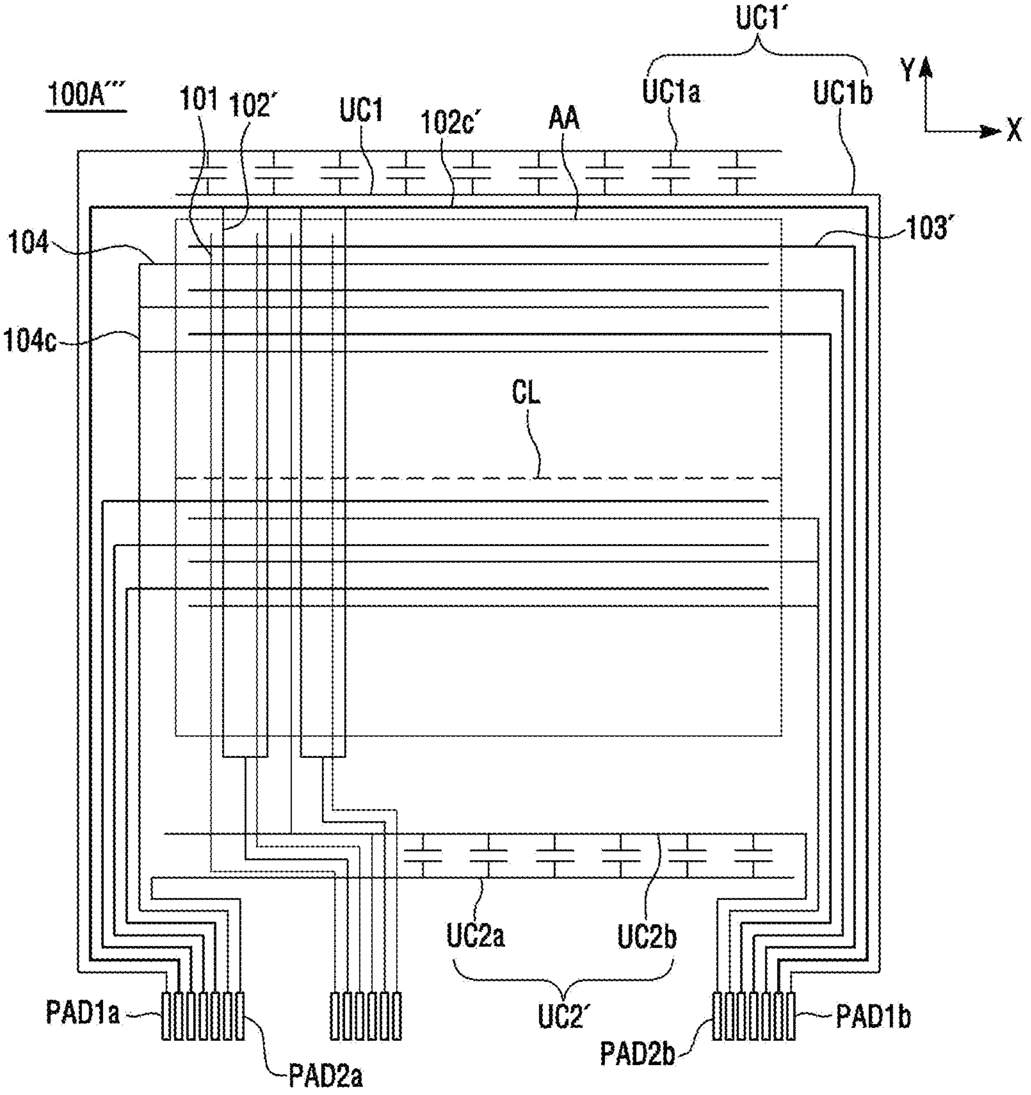

FIGS. 10 to 12 are views for explaining various embodiments of the sensor unit 100A in FIG. 9.

A sensor unit 100A' in FIG. 10 is obtained by adding two edge channels to the sensor unit 100" in FIG. 7. Specifically, on the XY plane, the first edge channel UC1' in FIG. 9 is added above the active area AA, and the second edge channel UC2 in FIG. 8 is added below the active area AA.

A sensor unit 100A" in FIG. 11 is obtained by adding two edge channels to the sensor unit 100" in FIG. 7. Specifically, on the XY plane, the first edge channel UC1 in FIG. 8 is added above the active area AA, and the second edge channel UC2' in FIG. 9 is added below the active area AA.

A sensor unit 100A'" in FIG. 12 is obtained by adding two edge channels to the sensor unit 100" in FIG. 7. Specifically, on the XY plane, the first edge channel UC1' in FIG. 9 is added above the active area AA, and the second edge channel UC2' in FIG. 9 is added below the active area AA.

FIGS. 13 to 16 are views for explaining various embodiments of a sensor unit of an electronic device according to a third embodiment of the present disclosure.

The electronic devices according to the third embodiment of the present disclosure in FIGS. 13 to 16 are portrait-type electronic devices corresponding to the landscape-type electronic devices in FIGS. 1 to 12.

In an active area AA' of the portrait-type electronic device, a width in the second direction X is less than a height in the first direction Y. A controller (not shown) that controls a sensor unit 100B of the portrait-type electronic device is disposed below the sensor unit 100B. The portrait-type electronic device has a shape corresponding to, e.g., that of a general smartphone.

Figure 13:
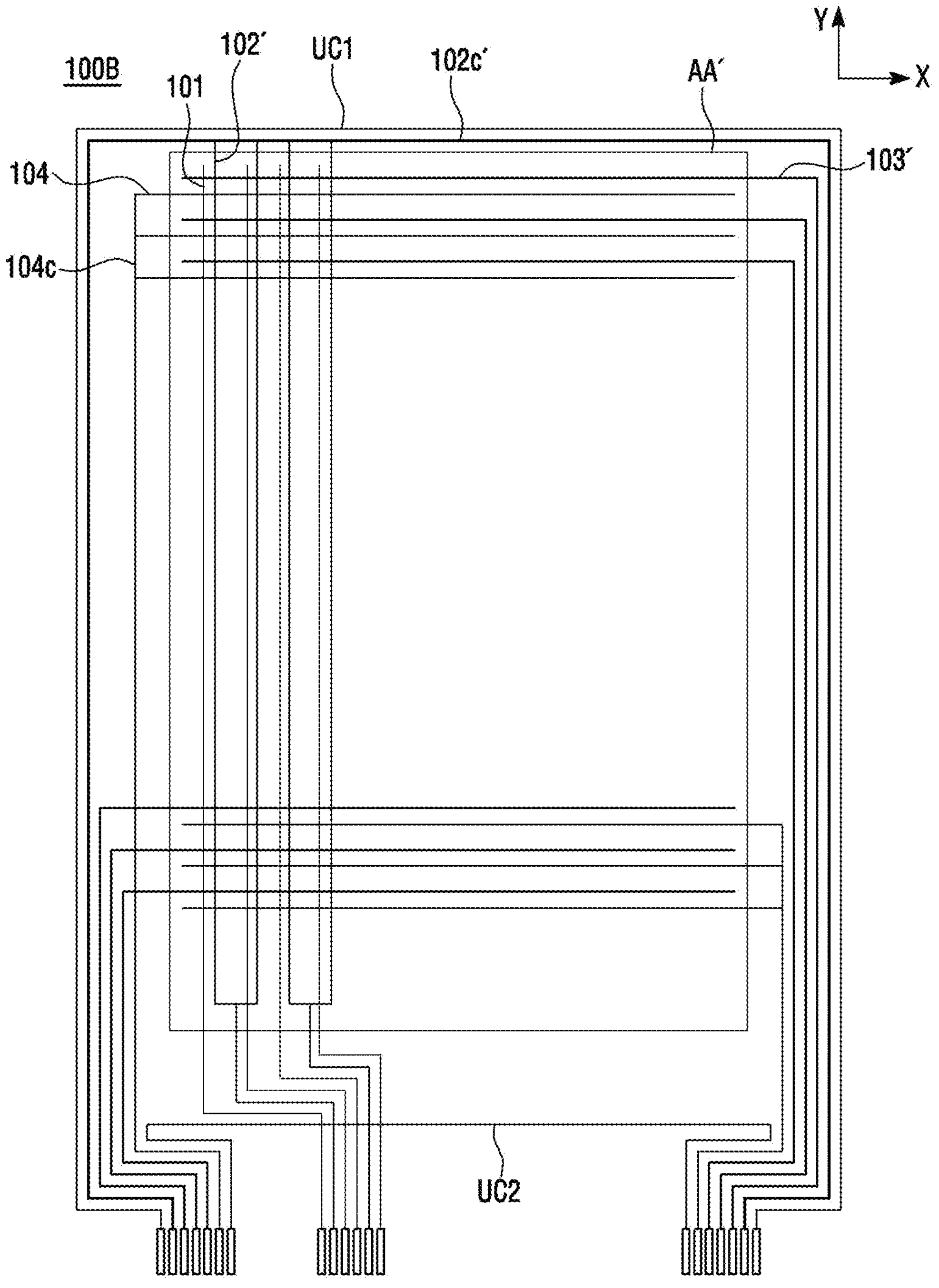
FIGS. 13 to 16 are views for explaining various embodiments of a sensor unit of an electronic device according to a third embodiment of the present disclosure.

The sensor unit 100B of FIG. 13 is obtained by changing the landscape-type sensor unit 100'" in FIG. 8 into the portrait-type sensor unit. Since the rest components are the same as those of the sensor unit 100'" in FIG. 8 except for a change of a shape of an active area AA' into the portrait type, a detailed description thereof will be replaced with the above descriptions.

Figure 14:
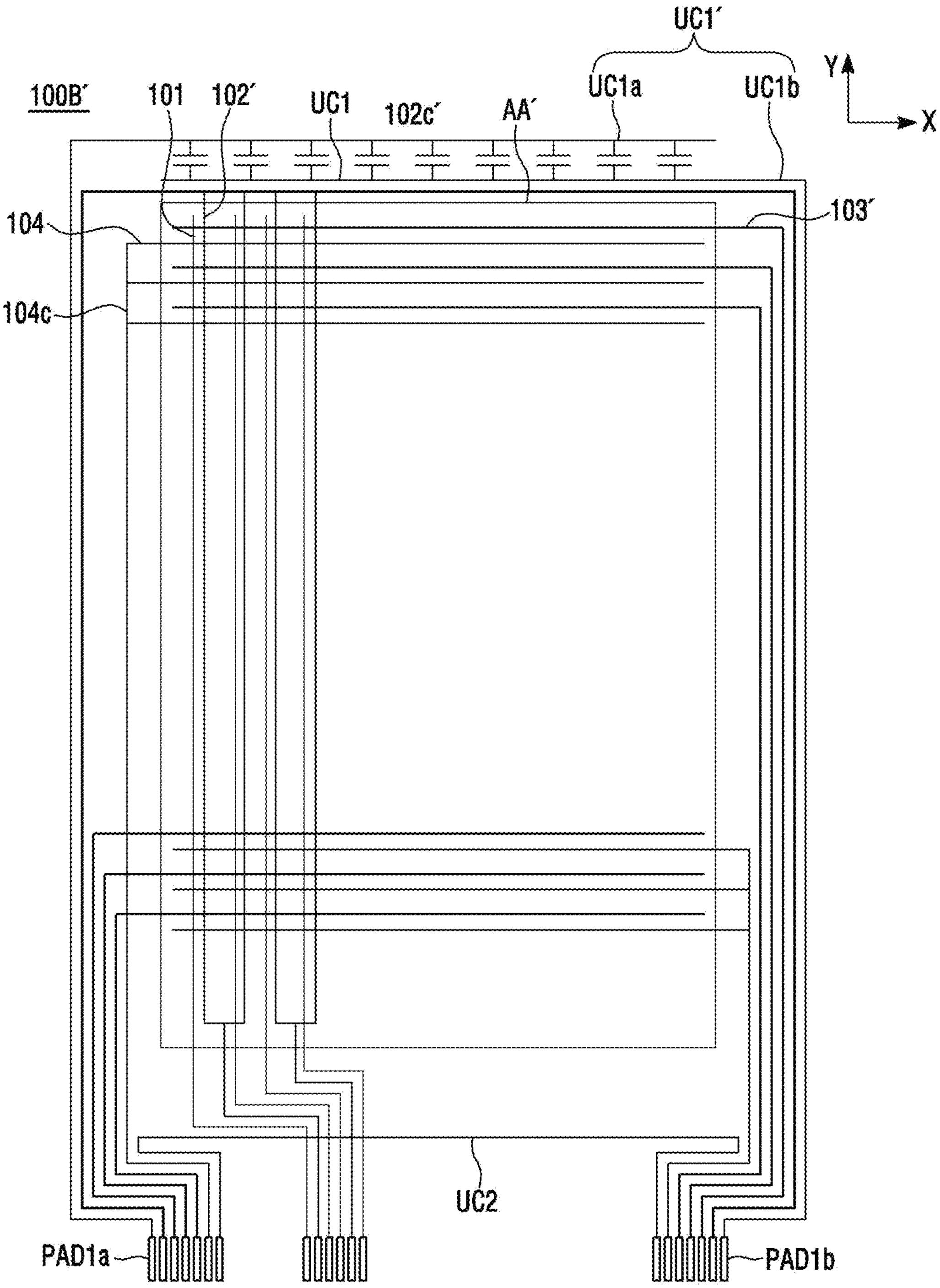

A sensor unit 100B' in FIG. 14 is obtained by changing the landscape-type sensor unit 100A' in FIG. 10 into the portrait-type sensor unit. Since the rest components are the same as those of the sensor unit 100A' in FIG. 10 except for a change of a shape of an active area AA' into the portrait type, a detailed description thereof will be replaced with the above descriptions.

Figure 15:
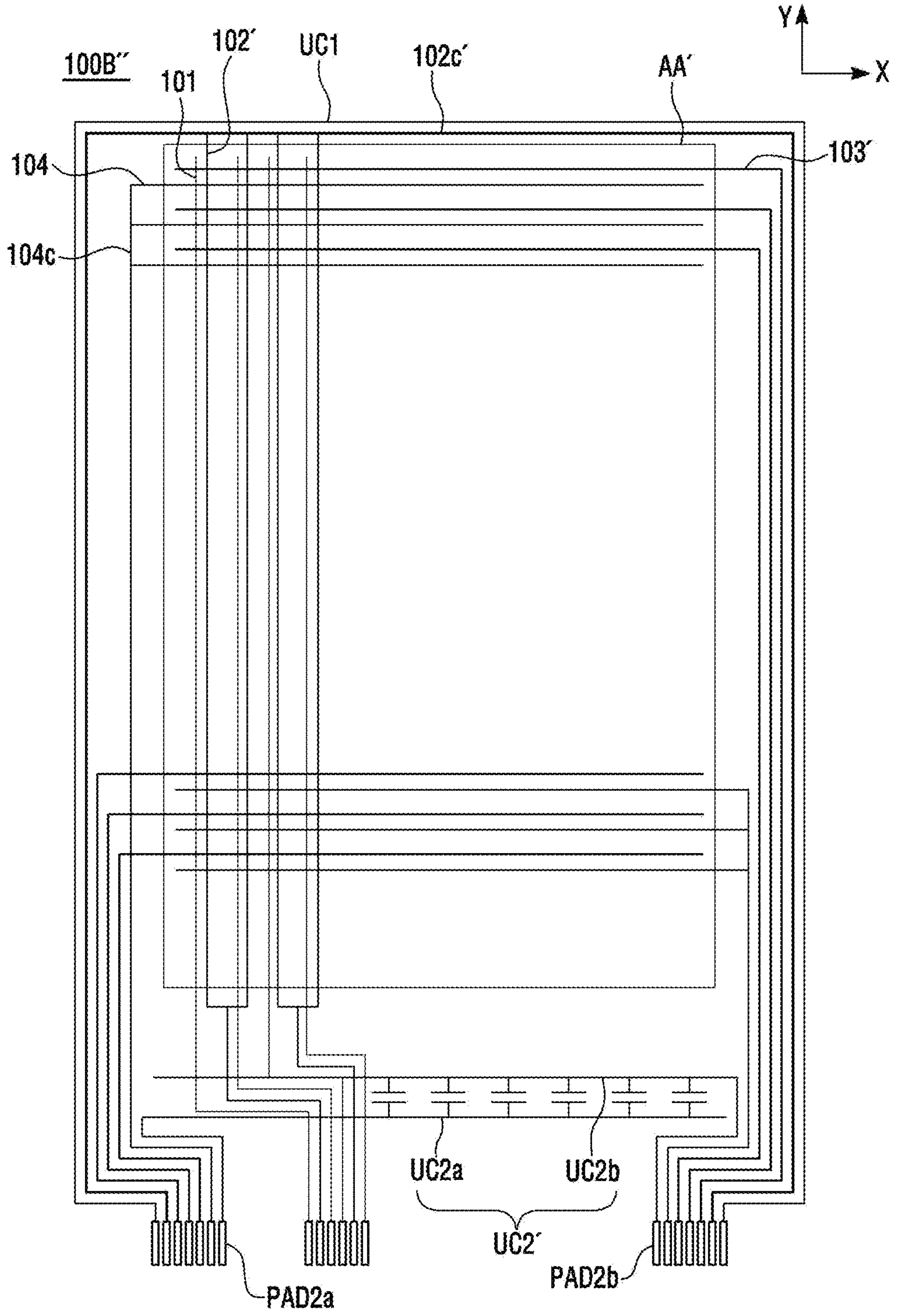

A sensor unit 100B" in FIG. 15 is obtained by changing the landscape-type sensor unit 100A" in FIG. 11 into the portrait-type sensor unit. Since the rest components are the same as those of the sensor unit 100A" in FIG. 11 except for a change of a shape of an active area AA' into the portrait type, a detailed description thereof will be replaced with the above descriptions.

Figure 16:
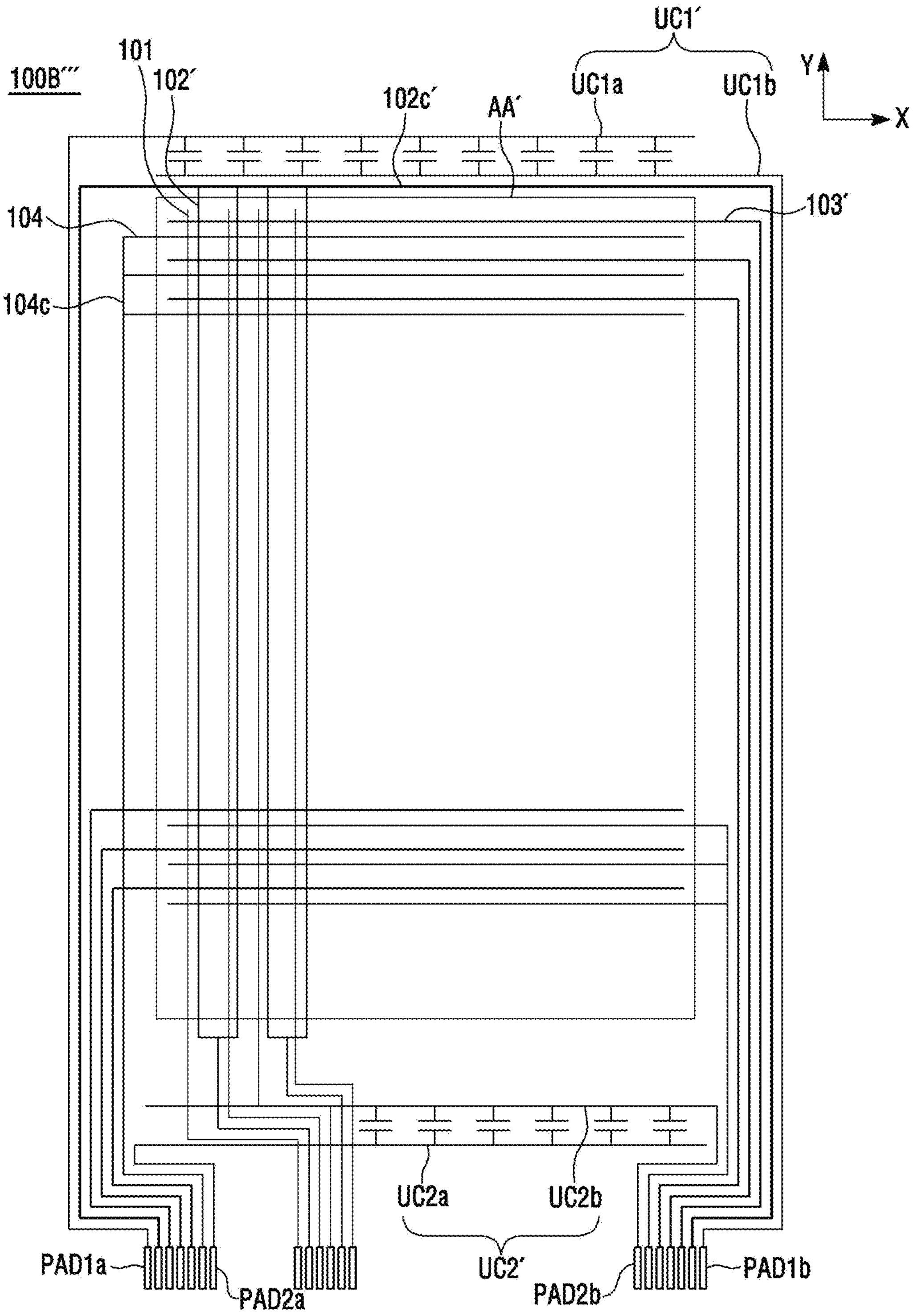

A sensor unit 100B'" in FIG. 16 is obtained by changing the landscape-type sensor unit 100A'" in FIG. 12 into the portrait-type sensor unit. Since the rest components are the same as those of the sensor unit 100A'" in FIG. 12 except for a change of a shape of an active area AA' into the portrait type, a detailed description thereof will be replaced with the above descriptions.

FIGS. 17 to 24 are views illustrating various alternative examples that may replace the rest components except for one or more edge channels UC1, UC1', UC2, and UC2' in the sensor units in FIGS. 6 and 8 to 16. That is, one or more edge channels UC1, UC1', UC2, and UC2' in FIGS. 6 and 8 to 16 may be applied to sensor units to be described below in FIGS. 17 to 24.

Figure 17:
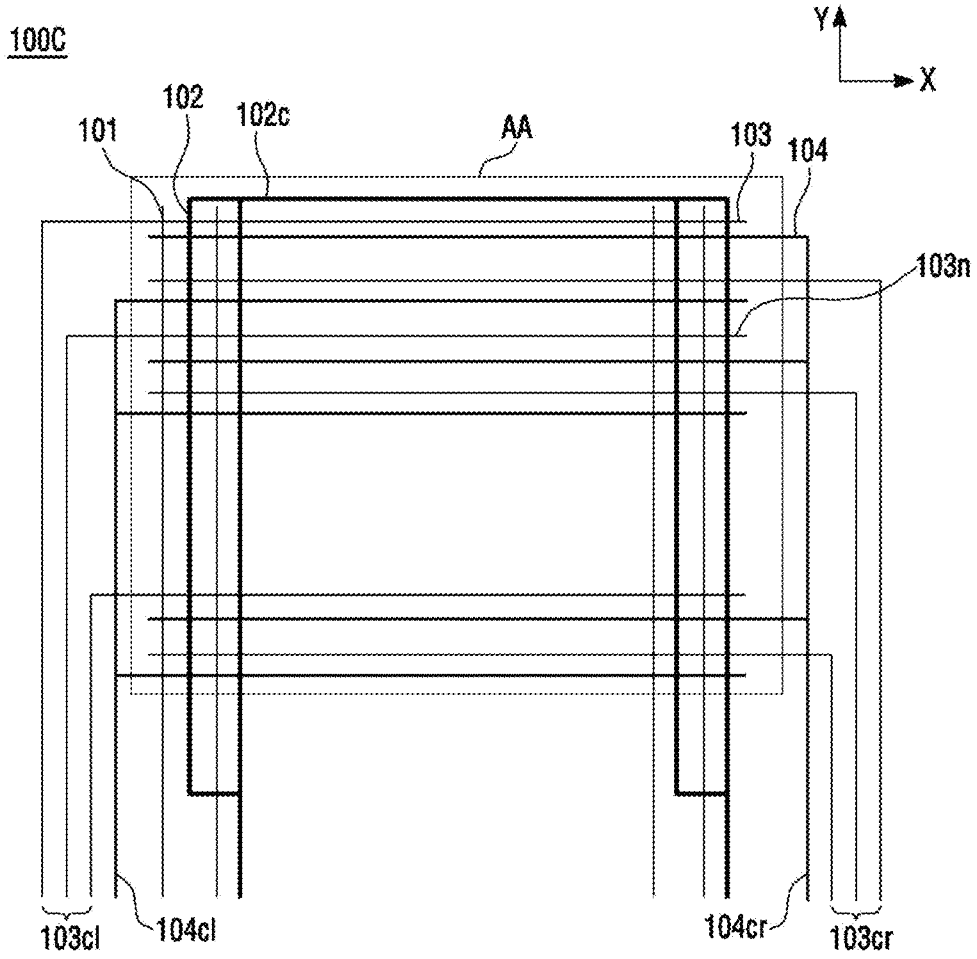
FIGS. 17 to 24 are views illustrating various alternative examples that may replace the rest components except for one or more edge channels UC1, UC1', UC2, and UC2' in the sensor units of FIGS. 6 and 8 to 16.

A sensor unit 100C in FIG. 17 includes first to fourth patterns 101, 102, 103, and 104.

Descriptions on a plurality of first patterns 101 and a plurality of second patterns 102 will be replaced with those on the plurality of first patterns 101 and the plurality of second patterns 102 in FIG. 6. A plurality of third patterns 103 includes some third patterns connected to a one side trace 103*cl* for connection with a controller (not shown) and other third patterns connected to the other side trace 103*cr*. The some third patterns and the other some third patterns are arranged alternately along the first direction Y.

Also, a plurality of fourth patterns 104 include some fourth patterns connected to one side trace 104*cl* for connection with the controller (not shown) and other fourth patterns connected to the other side trace 104*cr*. The some fourth patterns and the other fourth patterns are arranged alternately along the first direction Y.

When a left end of both ends of one of the plurality of third patterns 103 is connected to the trace 103*cl*, a right end of both ends of one of fourth patterns 104, which is adjacent to the third pattern 103, may be connected to the trace 104*cr*.

Since the traces 103*cl* and 103*cr* that connect the plurality of third patterns 103 f the sensor unit 100C and the controller (not shown) in FIG. 17 are arranged alternately, i.e., arranged once at a left side and then at a right side, along the first direction Y, the number of traces arranged at the left side and the number of traces arranged at the right side may be the same as or similar to each other to maintain uniformity.

The controller (not shown) may sense (first mode) a touch of an object such as a finger, drive (second mode) the stylus pen, and sense (third mode) the pen signal emitted from the stylus pen by using the sensor unit 100C in FIG. 17. Specifically, a method by which the controller (not shown) drives the sensor unit 100C for each mode will be described with reference to <Table 1> below.

TABLE 1

| | 103 | 101 | 104 | 102 |
|---|---|---|---|---|
| Touch | Driving | Receiving | | |
| | Receiving | Driving | | |
| Stylus | Receiving | Receiving | | Driving |
| | Receiving | | | Driving/Receiving |

Referring to FIG. 17 together with <Table 1>, the controller (not shown) may operate the sensor unit 100C in the first mode (Touch).

As an example of the first mode (Touch), the controller (not shown) may apply a touch driving signal to at least one of the plurality of third patterns 103 of the sensor unit 100C and receive a touch sensing signal from the plurality of first patterns 101. Here, the controller (not shown) may differentiate the touch sensing signal received from the plurality of first patterns 101.

As another example of the first mode (Touch), the controller (not shown) may apply a touch driving signal to at least one of the plurality of first patterns 101 of the sensor unit 100C and receive a touch sensing signal from the plurality of third patterns 103. Here, the controller (not shown) may differentiate the touch sensing signals received from the plurality of third patterns 103. When the controller (not shown) differentiates the touch sensing signals, the controller (not shown) may differentiate the touch sensing signals output from a n-th third pattern 103 and a n+2-th third pattern 103*n* in an order from the top of the plurality of third patterns 103.

The controller (not shown) may operate the sensor unit 100C in the second mode (Stylus/Driving). For example, the controller (not shown) may apply a pen driving signal to at least one of the plurality of second patterns 102 of the sensor unit 100C.

The controller (not shown) may operate the sensor unit 100C in the third mode (Stylus/Receiving).

As an example of the third mode (Stylus/Receiving), the controller (not shown) may receive a pen sensing signal from the plurality of first patterns 101 and the plurality of third patterns 103 of the sensor unit 100C. The pen sensing signal output from each of the first patterns 101 is transmitted from the second pattern 102 adjacent to the corresponding first pattern 101 through capacitive coupling. Also, the pen sensing signal output from each of the third patterns 103 is transmitted from the fourth pattern 104 adjacent to the corresponding third pattern 103 through capacitive coupling Here, the controller (not shown) may differentiate the pen sensing signals received from the plurality of first patterns 101 (or the plurality of third patterns 103). When the controller (not shown) differentiates the pen sensing signals, the touch controller (not shown) may differentiate the pen sensing signals output from the n-th third pattern 103 and the n+2-th third pattern 103*n* in an order from the top of the plurality of third patterns 103.

As another example of the third mode (Stylus/Receive), the controller (not shown) may receive the pen sensing signal from the plurality of third patterns 103 and the plurality of second patterns 102 of the sensor unit 100C. Also, the pen sensing signal output from each of the third patterns 103 is transmitted from the fourth pattern 104 adjacent to the corresponding third pattern 103 through capacitive coupling The pen sensing signal output from the plurality of second patterns 102, which is a signal directly induced to a pen signal from an external stylus pen, is not transmitted through capacitive coupling. Here, the controller (not shown) may differentiate the pen sensing signals received from the plurality of third patterns 103 (or plurality of second patterns 102). When the controller (not shown) differentiates the pen sensing signals, the touch controller (not shown) may differentiate the pen sensing signals output from the n-th third pattern 103 and the n+2-th third pattern 103*n* in an order from the top of the plurality of third patterns 103.

Although not shown in the drawings, when one ends of the plurality of fourth patterns 104 of the sensor unit 100C in FIG. 17, which are electrically floating, are electrically connected to the controller (not shown), the controller (not shown) may operate the sensor unit in the third mode (Stylus/Receiving). When operated in the third mode, the touch controller (not shown) may receive the pen sensing signal from the plurality of fourth patterns and the plurality of first patterns of the sensor unit or receive the pen sensing signal from the plurality of fourth patterns and the plurality of second patterns.

Figure 18:
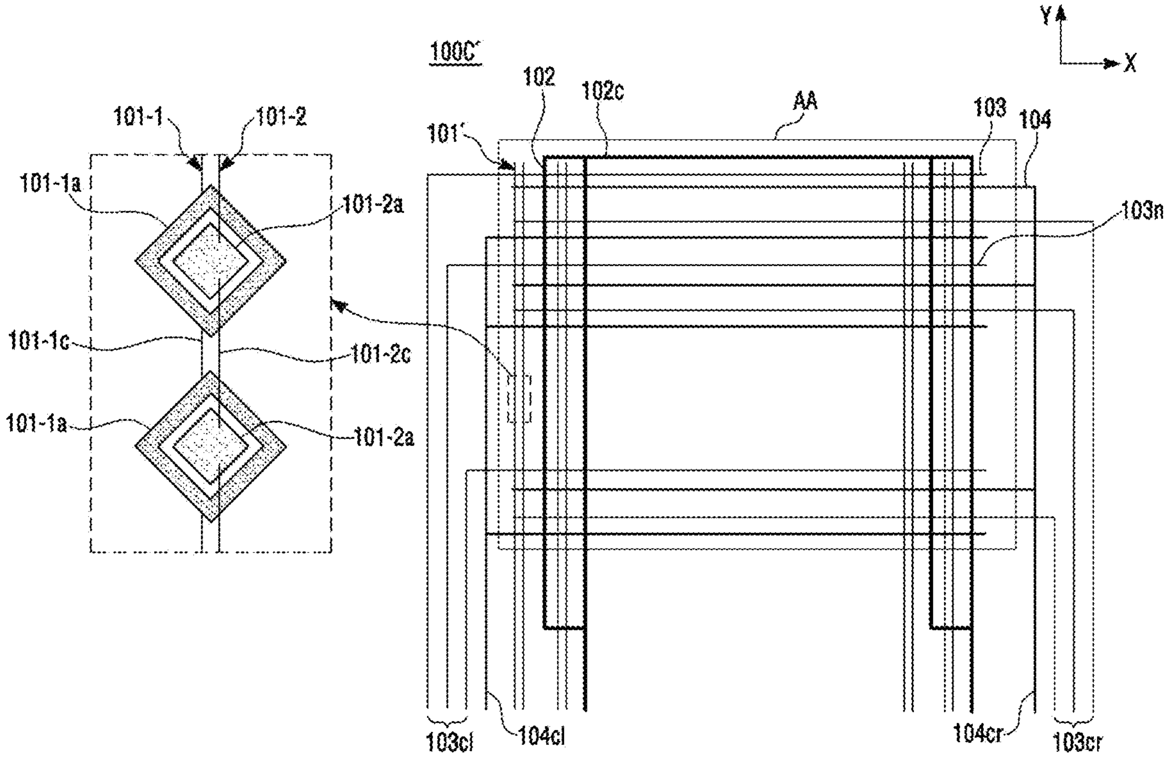

A sensor unit 100C' in FIG. 18 includes first to fourth patterns 101', 102, 103, and 104.

The sensor unit 100C' of FIG. 18 has a difference from the sensor unit 100C of FIG. 17 in terms of a plurality of first patterns 101'.

Each of the plurality of first patterns 101' includes a first-1 pattern 101-1 and a first-2 pattern 101-2, which are adjacent to each other.

The first-1 pattern 101-1 includes a plurality of main patterns 101-1*a* arranged in the first direction Y and connection patterns 101-1*c* that connect two adjacent main patterns 101-1*a* among the plurality of main patterns 101-1*a*. Each of the main patterns 101-1*a* of the first-1 pattern 101-1 may have a rectangular shape, a rhombus shape, or a diamond shape and have an opening in which each of the main patterns 101-2*a* of the first-2 pattern 101-2 is disposed.

The first-2 pattern 101-2 includes a plurality of main patterns 101-2*a* arranged in the first direction Y and connection patterns 101-2*c* that connect two adjacent main patterns 101-2*a* among the plurality of main patterns 101-2*a*. Each of the main patterns 101-2*a* of the first-2 pattern 101-2 may have a rectangular shape, a rhombus shape, or a diamond shape. Each of the main patterns 101-2*a* of the first-2 pattern 101-2 may have a shape corresponding to that of each of the main patterns 101-1*a* of the first-1 pattern 101-1.

Each of the main patterns 101-1*a* of the first-1 pattern 101-1 is disposed relatively closer to the third pattern 103 than each of the main patterns 101-2*a* of the first-2 pattern 101-2.

Each of the plurality of first patterns 101' includes the first-1 pattern 101-1 and the first-2 pattern 101-2, and each of the first-1 pattern 101-1 and the first-2 pattern 101-2 is connected to a controller (not shown). Thus, although the number of pins for the plurality of first patterns 101' in the controller (not shown) increases by two times in comparison with the sensor unit 100C in FIG. 17, in the first mode (touch driving mode), the controller (not shown) may apply the touch driving signal to the plurality of third patterns 103 and differentiate two touch sensing signals output from the first-1 pattern 101-1 and the first-2 pattern 101-2, respectively, to cancel a display noise and a low ground mass (LGM) caused by a poor ground of an object, which act on the sensor unit 100C, thereby improving sensing sensitivity.

Figure 19:
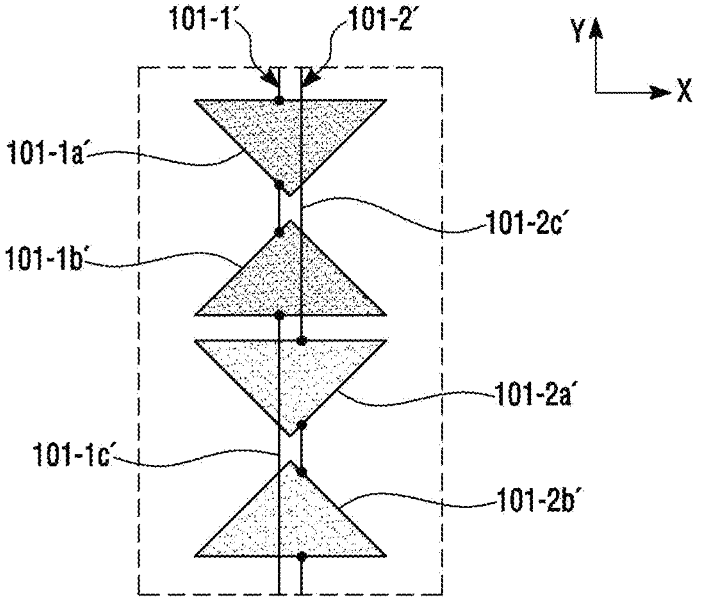

FIG. 19 is a view for explaining a modified example of the first-1 pattern 101-1 and the first-2 pattern 101-2 in FIG. 18.

Referring to FIG. 19, a first-1 pattern 101-1' includes a plurality of main patterns 101-1*a*' and 101-1*b*' arranged in the first direction Y and connection patterns 101-1*c*' that connect two adjacent main patterns 101-1*a*' and 101-1*b*' among the plurality of main patterns 101-1*a*' and 101-1*b*'. Each of the main patterns 101-1*a*' and 101-1*b*' of the first-1 pattern 101-1' may include a first main pattern 101-1*a*' and a second main pattern 101-1*b*'. The first main pattern 101-1*a*' and the second main pattern 101-1*b*' may have shapes that are symmetric with each other based on the second direction X. For example, each of the first main pattern 101-1*a*' and the second main pattern 101-1*b*' may have an inverted triangular shape. The first main pattern 101-1*a*' and the second main pattern 101-1*b*' may be electrically connected to each other.

The first-2 pattern 101-2' includes a plurality of main patterns 101-2*a*' and 101-2*b*' arranged in the first direction Y and connection patterns 101-2*c*' that connect two adjacent main patterns 101-2*a*' and 101-2*b*' among the plurality of main patterns 101-2*a*' and 101-2*b*'. Each of the main patterns 101-2*a*' and 101-2*b*' of the first-2 pattern 101-2' may include a first main pattern 101-2*a*' and a second main pattern 101-2*b*'. The first main pattern 101-2*a*' and the second main pattern 101-2*b*' may have shapes that are symmetric with each other based on the second direction X. For example, each of the first main pattern 101-2*a*' and the second main pattern 101-2*b*' may have an inverted triangular shape. The first main pattern 101-2*a*' and the second main pattern 101-2*b*' may be electrically connected to each other.

The plurality of main patterns 101-1*a*' and 101-1*b*' of the first-1 pattern 101-1' and the plurality of main patterns 101-2*a*' and 101-2*b*' of the first-2 pattern 101-2' are arranged alternately in the first direction Y.

Figure 20:
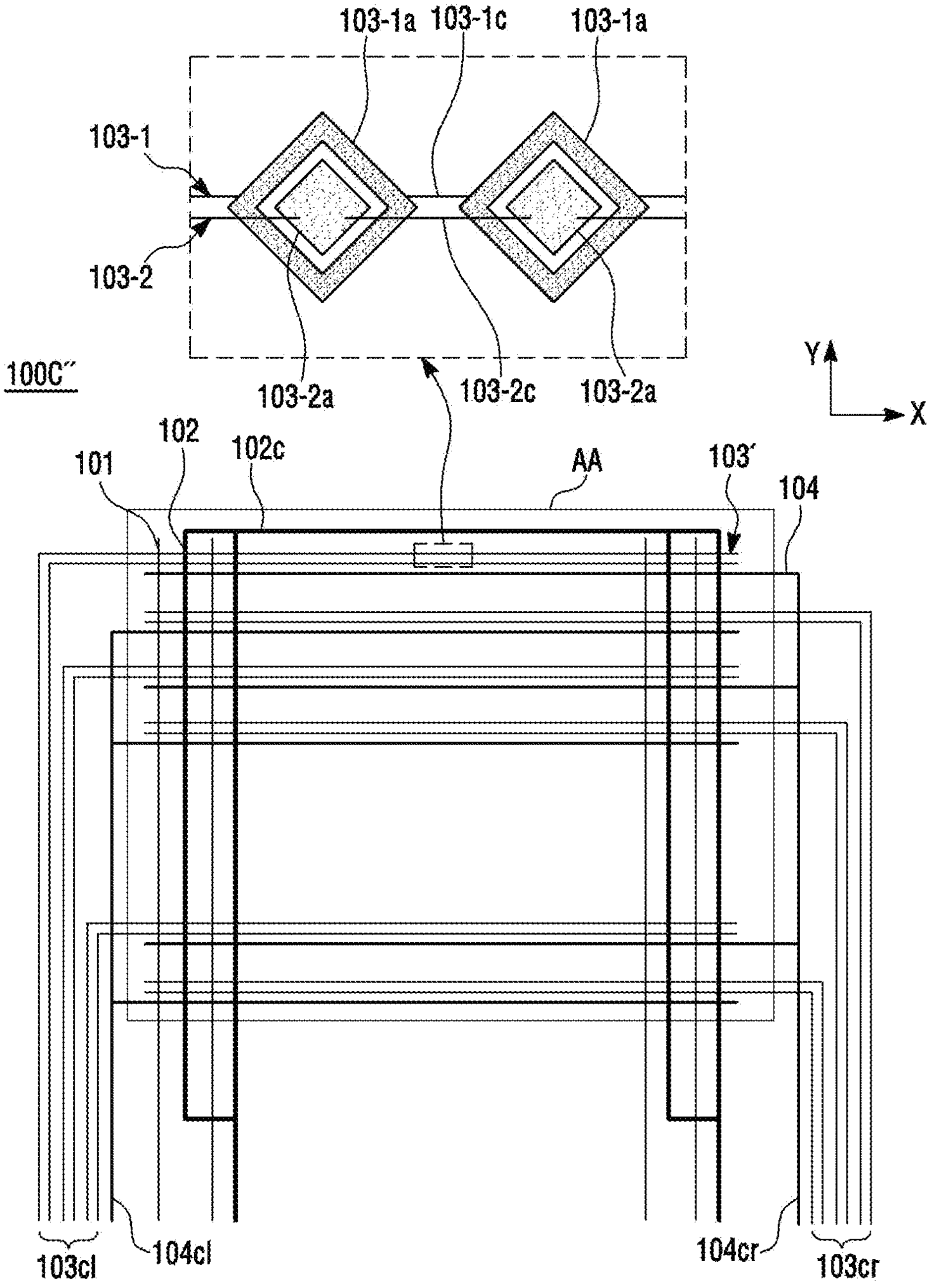

A sensor unit 100C" in FIG. 20 includes first to fourth patterns 101, 102, 103', and 104.

The sensor unit 100C" in FIG. 20 has a difference from the sensor unit 100C in FIG. 17 in terms of a plurality of third patterns 103'.

Each of the plurality of first patterns 103' includes a third-1 pattern 103-1 and a third-2 pattern 103-2.

The third-1 pattern 103-1 includes a plurality of main patterns 103-1*a* arranged in the second direction X and connection patterns 103-1*c* that connect two adjacent main patterns 103-1*a* among the plurality of main patterns 103-1*a*. Each of the main patterns 103-1*a* of the third-1 pattern 103-1 may have a rectangular shape, a rhombus shape, or a diamond shape and have an opening in which each of the main patterns 103-2*a* of the third-2 pattern 103-2 is disposed.

The third-2 pattern 103-2 includes a plurality of main patterns 103-2*a* arranged in the second direction X and connection patterns 103-2*c* that connect two adjacent main patterns 103-2*a* among the plurality of main patterns 103-2*a*. Each of the main patterns 103-2*a* of the third-2 pattern 103-2 may have a rectangular shape, a rhombus shape, or a diamond shape. Each of the main patterns 103-2*a* of the third-2 pattern 103-2 may have a shape corresponding to that of each of the main patterns 103-1*a* of the third-1 pattern 103-1.

Each of the main patterns 103-1*a* of the third-1 pattern 103-1 is disposed relatively closer to the first pattern 101 than each of the main patterns 103-2*a* of the third-2 pattern 103-2.

Each of the plurality of third patterns 103' includes the third-1 pattern 103-1 and the third-2 pattern 103-2, and each of the third-1 pattern 103-1 and the third-2 pattern 103-2 is connected to the controller (not shown). Thus, although the number of pins for the plurality of third patterns 103' in the controller (not shown) increases by two times when compared with the sensor unit 100C in FIG. 17, in the first mode (touch driving mode), the controller (not shown) may apply a touch driving signal to the third-1 pattern 103-1 and simultaneously apply a touch driving signal obtained by inverting a phase of the touch driving signal by 180° to the third-2 pattern 103-2 to reduce or remove a flicker occurring on the display panel including the sensor unit 100C". The flicker represents a feature in which flickering occurs on the display panel that is influenced when the touch driving signals applied simultaneously to at least two third patterns of the plurality of third patterns 103 of FIG. 17 are added. Since the touch driving signals having opposite phases are applied simultaneously to each of the third patterns 103' of the sensor unit 100C" of FIG. 20, even when the two touch driving signals are added together, a sum thereof is '0', which does not give an effect on the display panel. Thus, the flicker phenomenon does not occur.

Although not shown in the drawings, the third-1 pattern 103-3 and the third-2 pattern 103-2 of each of the third patterns 103' may have the pattern shape illustrated in FIG. 19.

Figure 21:
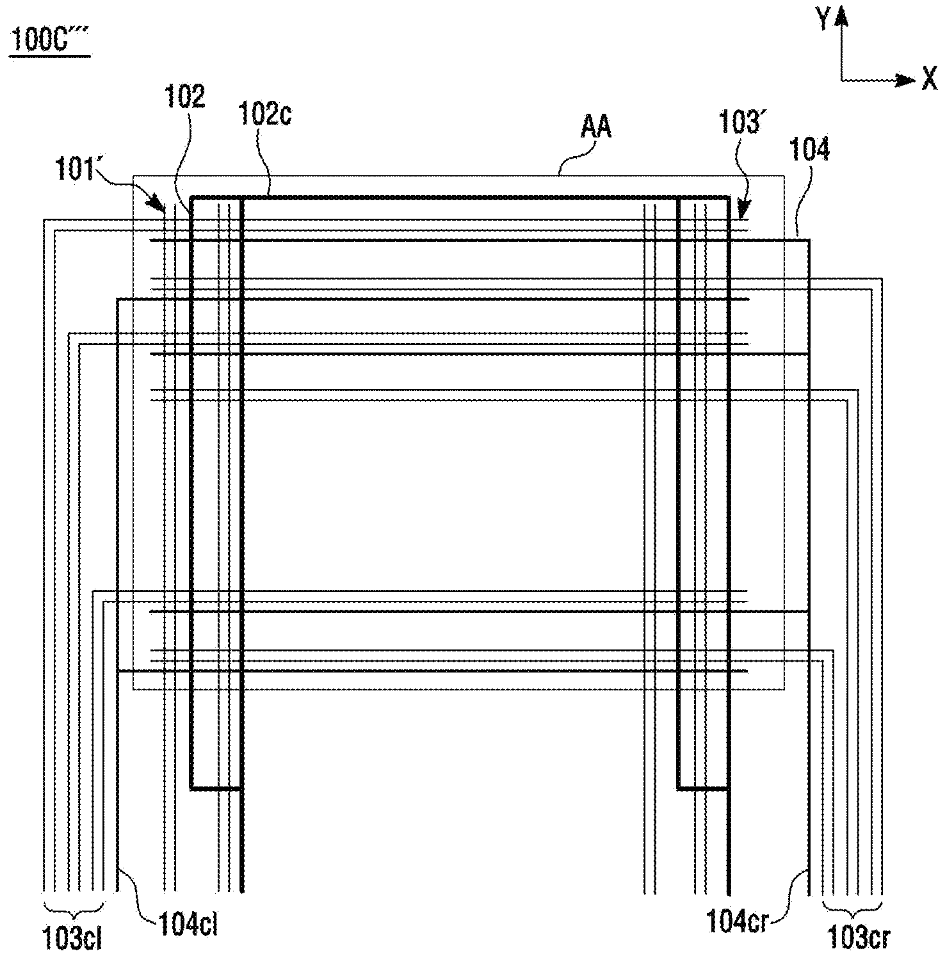

A sensor unit 100C'" in FIG. 21 includes first to fourth patterns 101', 102, 103', and 104.

When compared with the sensor unit 100C in FIG. 17, the sensor unit 100C'" in FIG. 21 has a difference in terms of a plurality of first patterns 101' and a plurality of third patterns 103'. The plurality of first patterns 101' is the same as the plurality of first patterns 101' in FIG. 18, and the plurality of third patterns 103' is the same as the plurality of third patterns 103' in FIG. 20.

Although there is a disadvantage in that the number of pins of the controller (not shown) slightly increases when the sensor unit 100C'" in FIG. 21 is used, the sensor unit 100C'" may exhibit all of technical effects of the sensor units 100C' and 100C" of FIGS. 18 and 20. That is, sensing sensitivity may be improved by canceling a display noise acting on the sensor unit 100C" and a low ground mass (LGM) caused by a poor ground of an object, and a flicker occurring on the display panel including the sensor unit 100C'" may be reduced or removed.

Figure 22:
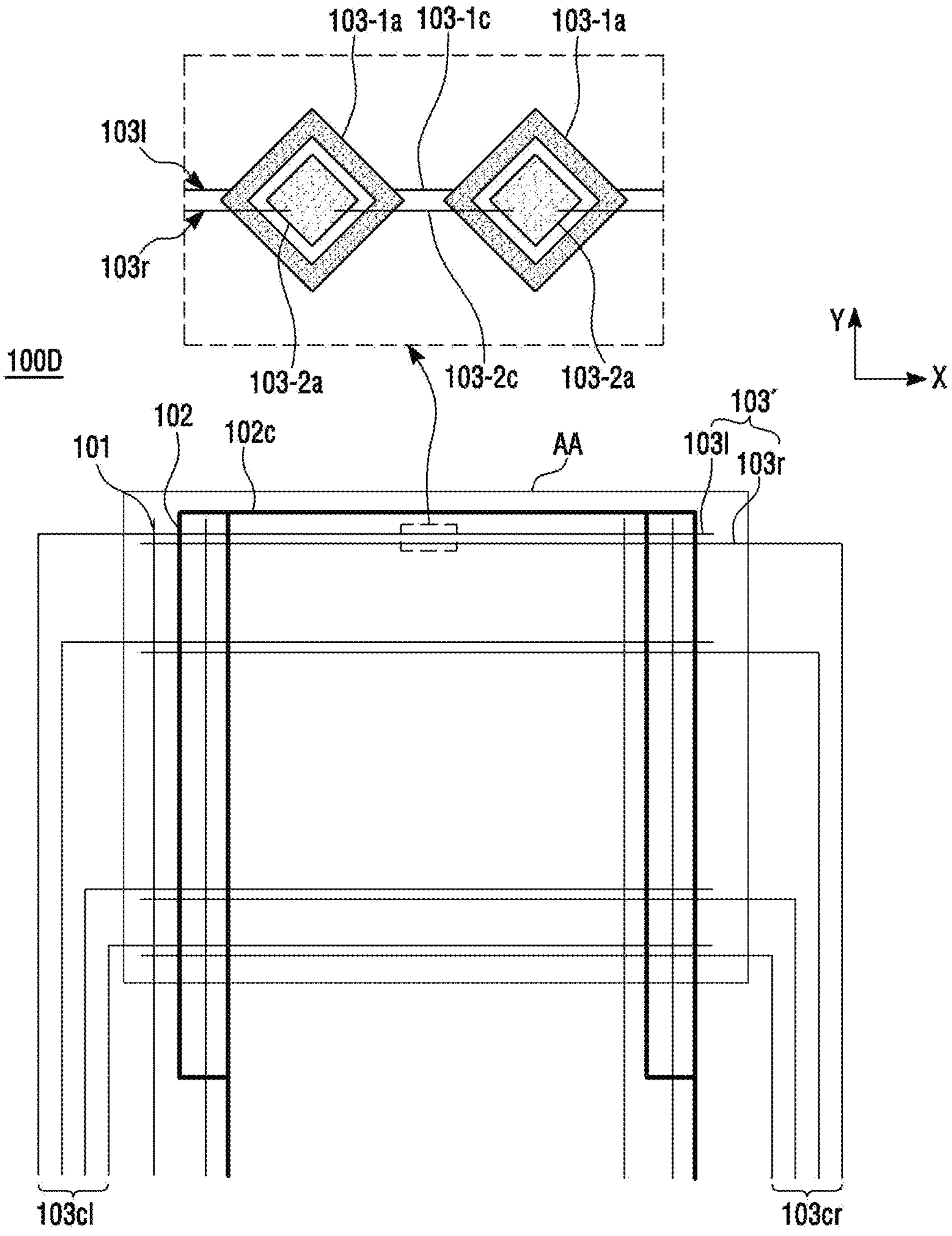

A sensor unit 100D in FIG. 22 includes a first pattern 101, a second pattern 102, and a third pattern 103'.

The sensor unit 100D in FIG. 22 has a difference from the sensor unit 100' in FIG. 6 in terms of a plurality of third patterns 103'.

Each of the plurality of third patterns 103' includes a third-1 pattern 1031 and a third-2 pattern 103*r*. The third-1 pattern 1031 and the third-2 pattern 103*r* are arranged in the second direction X and adjacent to each other. The third-1 pattern 1031 and the third-2 pattern 103*r* are physically spaced apart from each other to form capacitive coupling therebetween.

The third-1 pattern 1031 has both ends of which one end (left end) is electrically connected to the controller (not shown) through a trace 103*cl*, and the third-2 pattern 103*r* has both ends of which the other end (right end) is electrically connected to the controller (not shown) through a trace 103*cr.*

The third-1 pattern 1031 includes a plurality of main patterns 103-1*a* arranged in the second direction X and connection patterns 103-1*c* that connect two adjacent main patterns 103-1*a* among the plurality of main patterns 103-1*a*. Each of the main patterns 103-1*a* of the third-1 pattern 103*l* may have a rectangular shape, a rhombus shape, or a diamond shape and have an opening in which each of the main patterns 103-2*a* of the third-2 pattern 103*r* is disposed.

The third-2 pattern 103*r* includes a plurality of main patterns 103-2*a* arranged in the second direction X and connection patterns 103-2*c* that connect two adjacent main patterns 103-2*a* among the plurality of main patterns 103-2*a*. Each of the main patterns 103-2*a* of the third-2 pattern 103*r* may have a rectangular shape, a rhombus shape, or a diamond shape. Each of the main patterns 103-2*a* of the third-2 pattern 103*r* may have a shape corresponding to that of each of the main patterns 103-1*a* of the third-1 pattern 103*l*.

Each of the main patterns 103-1*a* of the third-1 pattern 103*l* is disposed relatively closer to the first pattern 101 than each of the main patterns 103-2*a* of the third-2 pattern 103*r.*

Each of the plurality of third patterns 103' includes the third-1 pattern 103*l* and the third-2 pattern 103*r*, and each of the third-1 pattern 103*l* and the third-2 pattern 103*r* is connected to the controller (not shown) through respective traces 103*cl* and 103*cr*. Thus, although the number of pins for the plurality of third patterns 103' in the controller (not shown) increases by two times when compared with the sensor unit 100' in FIG. 6, in the first mode (touch driving mode), the controller (not shown) may apply the touch driving signal to the plurality of first patterns 101 and differentiate two touch sensing signals output from the third-1 pattern 103*l* and the third-2 pattern 103*r*, respectively, to cancel a display noise acting on the sensor unit 100D and a low ground mass (LGM) caused by a poor ground of an object, thereby improving sensing sensitivity.

Although not shown in the drawings, the third-1 pattern 103*l* and the third-2 pattern 103*r* of each of the third patterns 103' may have the pattern shape illustrated in FIG. 19.

On the other hand, the controller (not shown) may operate the second mode (edge mode) by using the plurality of second patterns 102.

Also, the controller (not shown) may operate the third mode (downlink mode) by using the plurality of third patterns 103' and the plurality of first patterns 101. Here, the controller (not shown) may receive a pen signal transmitted from the second pattern 102 to the first pattern 101 by capacitive coupling. On the other hand, the controller (not shown) may directly receive the pen signal induced to the plurality of third patterns 103'.

Figure 23:
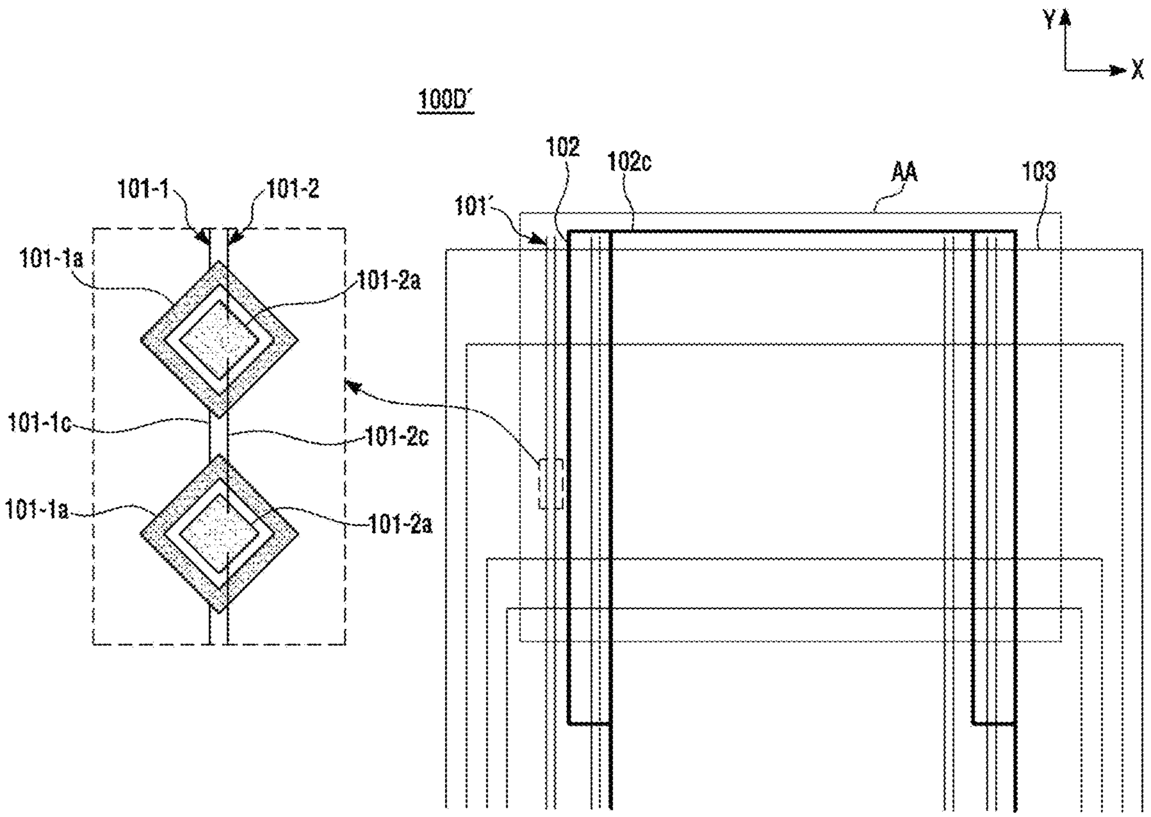

A sensor unit 100D' in FIG. 23 includes a first pattern 101', a second pattern 102, and a third pattern 103.

The sensor unit 100D' of FIG. 23 has a difference from the sensor unit 100' of FIG. 6 in terms of a plurality of first patterns 101'. A detailed description thereof will be replaced with that provided in FIG. 18.

Although the number of pins for the plurality of first patterns 101' in the controller (not shown) increases by two times when the sensor unit 100D' in FIG. 23 is compared with the sensor unit 100' in FIG. 6, in the first mode (touch driving mode), the controller (not shown) may apply the touch driving signal to the first-1 pattern 101-1 and simultaneously apply a touch driving signal obtained by inverting a phase of the touch driving signal by 180° to the first-2 pattern 101-2 to reduce or remove a flicker occurring on the display panel including the sensor unit 100D'.

Figure 24:
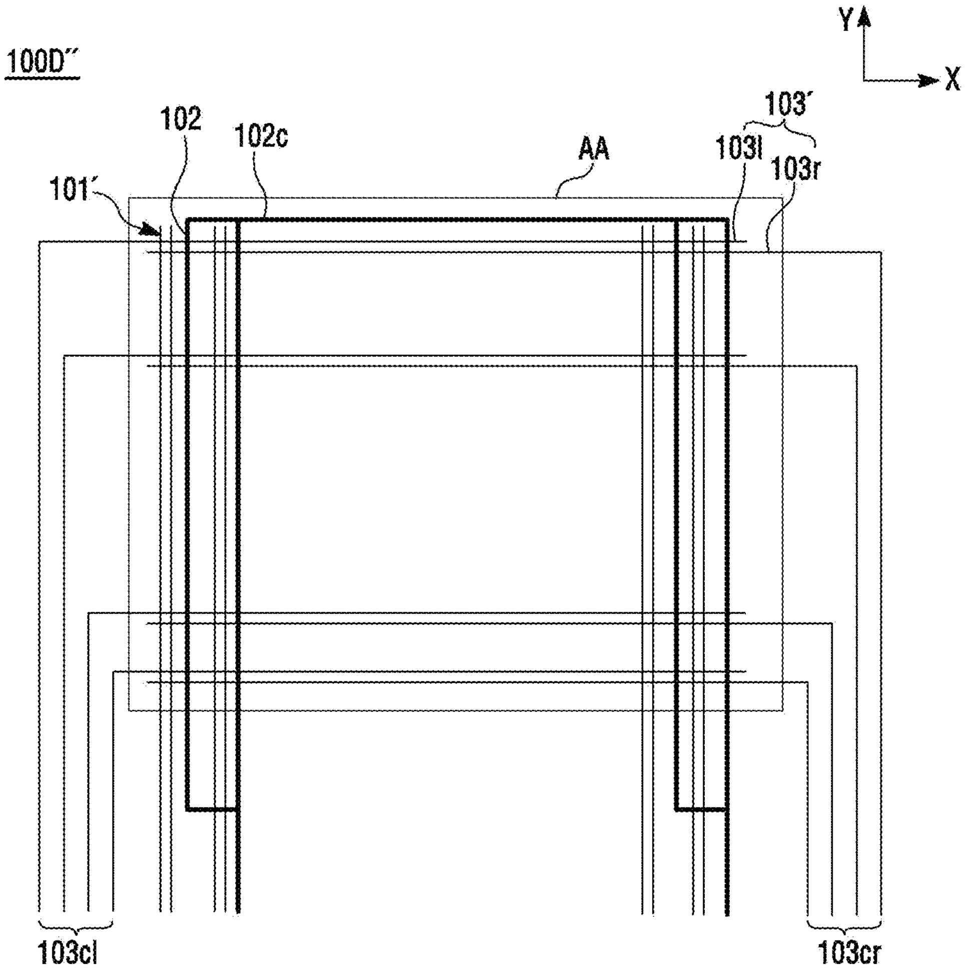

A sensor unit 100D" in FIG. 24 includes a first pattern 101', a second pattern 102, and a third pattern 103'.

When compared with the sensor unit 100' in FIG. 6, the sensor unit 100D" in FIG. 24 has a difference in terms of a plurality of first patterns 101' and a plurality of third patterns 103'. The plurality of first patterns 101' is the same as the plurality of first patterns 101' in FIG. 23, and the plurality of third patterns 103' is the same as the plurality of third patterns 103' in FIG. 22.

Although there is a disadvantage in that the number of pins of the controller (not shown) slightly increases when the sensor unit 100D" in FIG. 24 is used, the sensor unit 100D" may exhibit all of technical effects of the sensor units 100D and 100D' in FIGS. 22 and 23. That is, sensing sensitivity may be improved by canceling a display noise acting on the sensor unit 100D" and a low ground mass (LGM) caused by a poor ground of an object, and a flicker occurring on the display panel including the sensor unit 100D" may be reduced or removed.

The electronic device according to the embodiment of the present disclosure has an advantage in that the electronic device does not require additional sensor (e.g., a digitizer) for driving and/or sensing the stylus pen.

Also, the electronic device according to the embodiment of the present disclosure has an advantage of simultaneously sensing both the stylus pen and the object such as a finger brought into proximity or contact with the electronic device from the outside.

Also, the electronic device according to the embodiment of the present disclosure has an advantage of improving the sensitivity degradation of the stylus pen at the edge portion of the active area of the display screen.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:

a display panel having an active area and a dead space;

a sensor unit comprising a plurality of patterns of which at least a portion overlaps the active area, wherein the plurality of patterns comprise a plurality of first patterns extending in a first direction and a plurality of third patterns extending in a second direction crossing the first direction; and a controller configured to control the sensor unit, wherein the sensor unit comprises a first edge pattern that overlaps the dead space, is disposed adjacent to the active area, and has both ends electrically connected to the controller, and wherein the controller is configured to:

operate in a first mode to sense a conductive object using the plurality of first patterns and the plurality of third patterns;

operate in a third mode to determine a position of a stylus pen by receiving a pen signal emitted from the stylus pen using the plurality of first patterns and the plurality of third patterns; and receive the pen signal through the first edge pattern in the third mode.

2. The electronic device of claim 1, wherein the controller applies a driving signal for driving a stylus pen to the edge pattern and patterns arranged in a direction parallel to the edge pattern among the plurality of patterns.

3. The electronic device of claim 1, wherein the edge pattern comprises a first edge pattern and a second edge pattern, and the active area is disposed between the first edge pattern and the second edge pattern.

4. The electronic device of claim 1, wherein the plurality of first patterns have one ends that are electrically connected to the controller;

the plurality of patterns further comprise a plurality of second patterns each of which is arranged in the first direction and which are disposed adjacent to one of the plurality of first patterns and have one ends that are electrically connected to each other; and the plurality of third patterns have both ends that are electrically connected to the controller.

5. The electronic device of claim 4, wherein each of the plurality of third patterns comprises a third-1 pattern having one end that is electrically connected to the controller and the other end that is electrically floated and a third-2 pattern having one end that is electrically floated and the other end that is electrically connected to the controller, and the third-1 pattern is disposed relatively closer to an adjacent first pattern of the plurality of first patterns than the third-2 pattern.

6. The electronic device of claim 4, wherein each of the plurality of first patterns comprises a first-1 pattern and a first-2 pattern, which are electrically insulated from each other, and the first-1 pattern is disposed relatively closer to an adjacent third pattern of the plurality of third patterns than the first-2 pattern.

7. The electronic device of claim 1, wherein the plurality of first patterns have one ends that are electrically connected to the controller;

the plurality of patterns further comprise a plurality of second patterns each of which is arranged in the first direction and which are disposed adjacent to one of the plurality of first patterns and have one ends that are electrically connected to each other;

the plurality of third patterns have one ends that are electrically connected to the controller; and the plurality of patterns further comprise a plurality of fourth patterns each of which is arranged in the second direction and which are disposed adjacent to one of the plurality of third patterns and have one ends that are electrically connected to each other.

8. The electronic device of claim 7, further comprising a connection pattern connected to the one ends of the plurality of second patterns, disposed in the dead space adjacent to the active area, and having both ends that are electrically connected to the controller, wherein the connection pattern is disposed between the first edge pattern and the active area.

9. The electronic device of claim 8, wherein the plurality of fourth patterns comprise some fourth patterns having both ends of which one ends are electrically connected to each other and other fourth patterns having both the ends of which the other ends are electrically connected to each other, and the some fourth patterns and the other fourth patterns are arranged alternately along the first direction.

10. The electronic device of claim 8, wherein each of the plurality of third patterns comprises a third-1 pattern and a third-2 pattern, which are electrically insulated from each other, and the third-1 pattern is disposed relatively closer to an adjacent first pattern of the plurality of first patterns than the third-2 pattern.

11. The electronic device of claim 8, wherein each of the plurality of first patterns comprises a first-1 pattern and a first-2 pattern, which are electrically insulated from each other, and the first-1 pattern is disposed relatively closer to an adjacent third pattern of the plurality of third patterns than the first-2 pattern.

12. The electronic device of claim 7, wherein the plurality of third patterns comprise some third patterns having both ends of which one ends are electrically connected to the controller and other third patterns having both the ends of which the other ends are electrically connected to the controller, and the some third patterns and the other third patterns are arranged alternately along the first direction.

13. The electronic device of claim 1, wherein the active area has a landscape shape in which a length in a horizontal direction is greater than a length in a vertical direction, and the first edge pattern is disposed in the horizontal direction.

14. The electronic device of claim 13, wherein the display panel is folded about a reference line in the horizontal direction, which crosses a central portion of the active area.

15. An electronic device comprising:

a display panel having an active area and a dead space;

a sensor unit comprising a plurality of patterns of which at least a portion overlaps the active area, wherein the plurality of patterns comprise a plurality of first patterns extending in a first direction and a plurality of third patterns extending in a second direction crossing the first direction; and a controller configured to control the sensor unit, wherein the sensor unit comprises a first edge pattern that overlaps the dead space and is disposed adjacent to one side of the active area, and the first edge pattern comprises:

a first-1 edge pattern having one end that is electrically floated and the other end that is electrically connected to the controller; and a first-2 edge pattern disposed adjacent to the first-1 edge pattern and having one end that is electrically connected to the controller and the other end that is electrically floated, wherein the controller is configured to:

operate in a first mode to sense a conductive object using the plurality of first patterns and the plurality of third patterns; and operate in a third mode to determine a position of a stylus pen by receiving a pen signal emitted from the stylus pen using the plurality of first patterns and the plurality of third patterns, and wherein, in the third mode, a capacitive coupling is formed between the first-1 edge pattern and the first 2 edge pattern, and the controller is configured to receive the pen signal through the first-1 edge pattern and the first-2 edge pattern via the capacitive coupling.

16. The electronic device of claim 15, wherein the controller applies a driving signal for driving a stylus pen to the first edge pattern and patterns arranged in a direction parallel to the first edge pattern among the plurality of patterns.

17. The electronic device of claim 15, wherein the sensor unit comprises a second edge pattern that overlaps the dead space and is disposed adjacent to the other side of the active area.

18. The electronic device of claim 17, wherein the second edge pattern comprises:

a second-1 edge pattern having one end that is electrically floated and the other end that is electrically connected to the controller; and a second-2 edge pattern disposed adjacent to the second-1 edge pattern and having one end that is electrically connected to the controller and the other end that is electrically floated.

* * * * *